US012558613B2

(12) United States Patent
Liu et al.

(10) Patent No.: US 12,558,613 B2
(45) Date of Patent: Feb. 24, 2026

(54) CONTROL METHOD AND ELECTRONIC DEVICE

(71) Applicant: Huawei Technologies Co., Ltd., Shenzhen (CN)

(72) Inventors: Hang Liu, Shenzhen (CN); Xiaohan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/258,712

(22) PCT Filed: Dec. 10, 2021

(86) PCT No.: PCT/CN2021/137057
§ 371 (c)(1),
(2) Date: Jun. 21, 2023

(87) PCT Pub. No.: WO2022/135177
PCT Pub. Date: Jun. 30, 2022

(65) Prior Publication Data
US 2024/0042309 A1 Feb. 8, 2024

(30) Foreign Application Priority Data

Dec. 26, 2020 (CN) .......................... 202011570623.4
Feb. 26, 2021 (CN) .......................... 202110217669.6

(51) Int. Cl.
*A63F 13/22* (2014.01)
*A63F 13/213* (2014.01)
(Continued)

(52) U.S. Cl.
CPC ............ *A63F 13/22* (2014.09); *A63F 13/213* (2014.09); *A63F 13/23* (2014.09); *A63F 13/67* (2014.09)

(58) Field of Classification Search
CPC ........ A63F 13/22; A63F 13/213; A63F 13/23; A63F 13/67
See application file for complete search history.

(56) References Cited

U.S. PATENT DOCUMENTS 8,146,005 B2 * 3/2012 Jones ...................... G06T 13/40
704/258
10,653,945 B1 * 5/2020 Lotzer .................... A63F 13/90
(Continued)

FOREIGN PATENT DOCUMENTS

CN 102043897 A 5/2011
CN 103823555 A 5/2014
(Continued)

*Primary Examiner* — Malina D. Blaise
(74) *Attorney, Agent, or Firm* — Conley Rose, P.C.

(57) ABSTRACT
An electronic device may learn a specific somatosensory action completed by a user, and also record a specific remote control key selected by the user, and then the electronic device may associate the action with the key. When recognizing that the user completes the action, the electronic device may simulate a control signal generated by the key, to control a game operation. Accordingly, the user can simply and quickly transform a conventional game into a somatosensory game. In this process, a game manufacturer does not need to perform additional customization work, and the user does not need to use an additional somatosensory device.

20 Claims, 16 Drawing Sheets

(51) Int. Cl.
    *A63F 13/23*        (2014.01)
    *A63F 13/67*        (2014.01)

(56) References Cited

U.S. PATENT DOCUMENTS

| | | | |
|---|---|---|---|
| 11,386,600 B2 * | 7/2022 | Joo | G06F 3/14 |
| 11,590,418 B2 * | 2/2023 | Mahlmeister | A63F 13/285 |
| 11,701,585 B2 * | 7/2023 | Mahlmeister | A63F 13/21 |
| | | | 463/37 |
| 11,709,582 B2 * | 7/2023 | Aronzon | G06F 3/0486 |
| | | | 715/771 |
| 2010/0138798 A1 * | 6/2010 | Wilson | G06T 7/285 |
| | | | 715/863 |
| 2011/0007079 A1 * | 1/2011 | Perez | A63F 13/56 |
| | | | 345/473 |
| 2011/0086706 A1 * | 4/2011 | Zalewski | G06F 3/017 |
| | | | 463/36 |
| 2013/0059660 A1 * | 3/2013 | Zalewski | A63F 13/61 |
| | | | 463/36 |
| 2013/0229344 A1 * | 9/2013 | Ivanich | H04N 21/42204 |
| | | | 345/156 |
| 2013/0274018 A1 * | 10/2013 | Zalewski | A63F 13/42 |
| | | | 463/37 |
| 2020/0306640 A1 * | 10/2020 | Kolen | G06N 3/094 |

FOREIGN PATENT DOCUMENTS

| | | |
|---|---|---|
| CN | 107656611 A | 2/2018 |
| CN | 110559645 A | 12/2019 |
| CN | 111913574 A | 11/2020 |
| WO | 2014113507 A1 | 7/2014 |

* cited by examiner

User interface 35

User interface 36

User interface 37

User interface 38

User interface 39

User interface 41

User interface 44

User interface 51

User interface 52

User interface 53

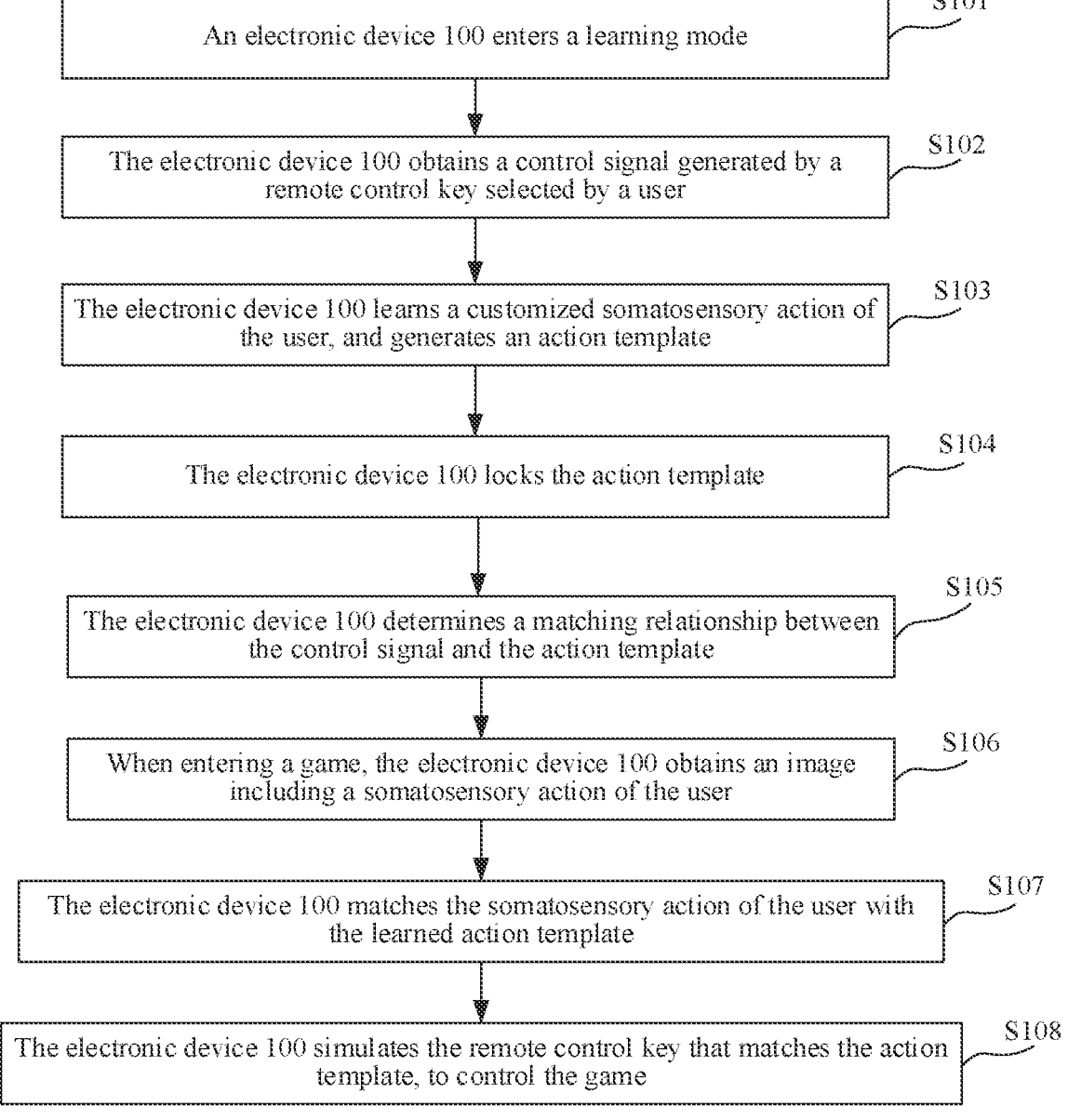

An electronic device 100 enters a learning mode ⟋ S101

The electronic device 100 obtains a control signal generated by a remote control key selected by a user ⟋ S102

The electronic device 100 learns a customized somatosensory action of the user, and generates an action template ⟋ S103

The electronic device 100 locks the action template ⟋ S104

The electronic device 100 determines a matching relationship between the control signal and the action template ⟋ S105

When entering a game, the electronic device 100 obtains an image including a somatosensory action of the user ⟋ S106

The electronic device 100 matches the somatosensory action of the user with the learned action template ⟋ S107

The electronic device 100 simulates the remote control key that matches the action template, to control the game ⟋ S108

FIG. 6A

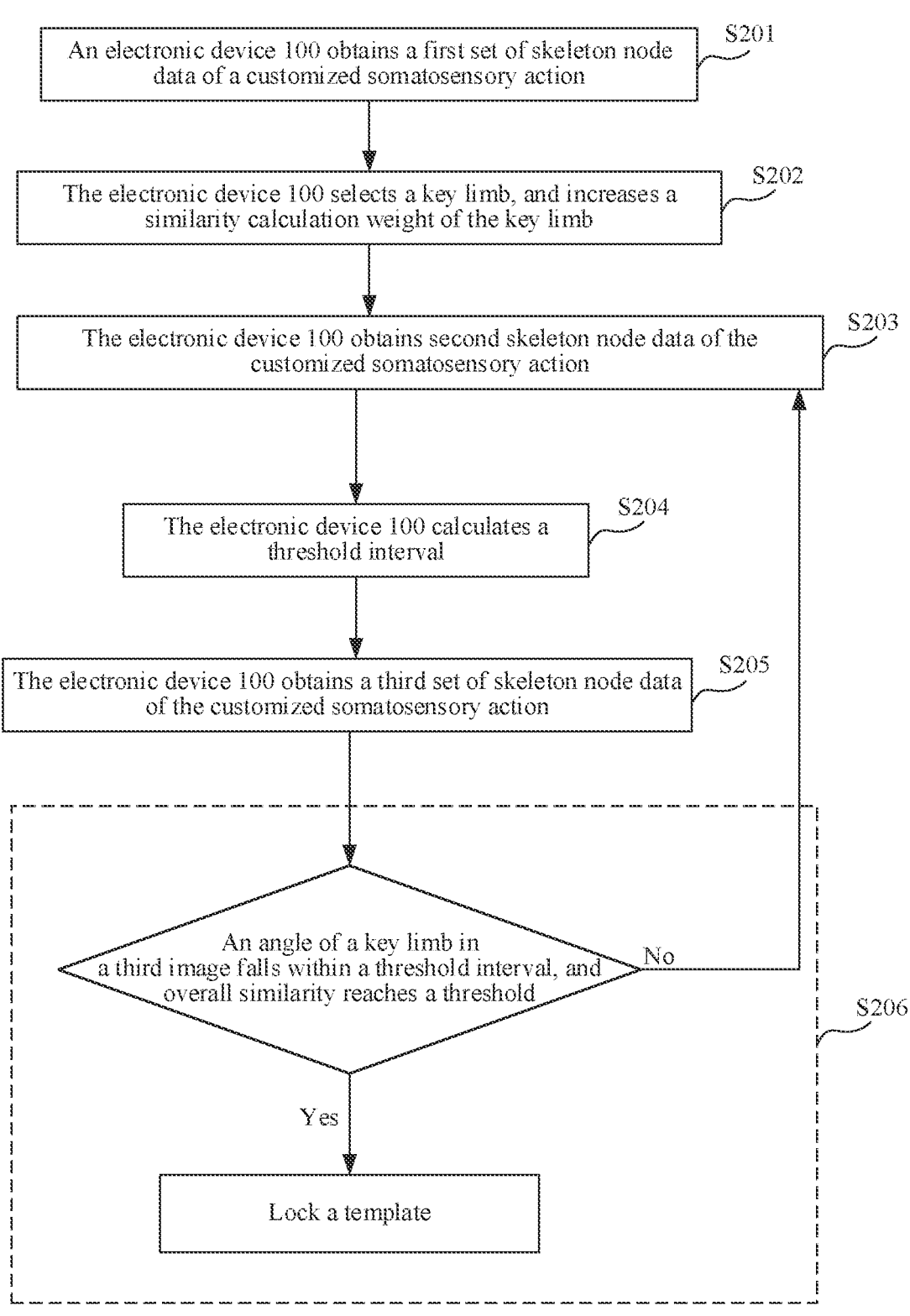

An electronic device 100 obtains a first set of skeleton node data of a customized somatosensory action — S201

The electronic device 100 selects a key limb, and increases a similarity calculation weight of the key limb — S202

The electronic device 100 obtains second skeleton node data of the customized somatosensory action — S203

The electronic device 100 calculates a threshold interval — S204

The electronic device 100 obtains a third set of skeleton node data of the customized somatosensory action — S205

An angle of a key limb in a third image falls within a threshold interval, and overall similarity reaches a threshold No Yes Lock a template

CONTROL METHOD AND ELECTRONIC DEVICE

CROSS-REFERENCE TO RELATED APPLICATIONS

This is a National Stage of International Patent Application No. PCT/CN2021/137057 filed on Dec. 10, 2021, which claims priority to Chinese Patent Application No. 202110217669.6 filed on Feb. 26, 2021 and Chinese Patent Application No. 202011570623.4 filed on Dec. 26, 2020, all of which are hereby incorporated by reference in their entireties.

TECHNICAL FIELD

This application relates to the terminal field, and in particular, to a control method and an electronic device.

BACKGROUND

To resolve a problem of a sub-health state caused by people's fast-paced work in today's society, smart-fitness-guided home exercise programs have been added to many web televisions. The smart-fitness-guided home exercise programs can provide users with relatively professional fat reduction and strength training, to achieve an exercise and fitness effect. However, the smart-fitness-guided home exercise programs are relatively boring, and it is difficult for the users to stick to the programs. How to maintain exercise fun while ensuring an exercise and fitness effect is an urgent problem to be resolved in a current home exercise program.

SUMMARY

This application provides a control method and an electronic device. Through implementation of the method, a conventional game controlled by using a remote control can be simply and quickly transformed into a somatosensory game.

According to a first aspect, an embodiment of this application provides a control method. The method is applied to an electronic device, and the method includes: the electronic device obtains a first key signal, where the first key signal is a control signal generated by a first key on a remote control; an operation object performs a first action in response to the first key signal; the electronic device obtains a first action template, where the first action template is used to recognize a first somatosensory action performed by a user; the electronic devices associates the first key signal with the first action template; the electronic device obtains an image sequence including a user action; when recognizing that the action indicated by the image sequence matches the first action template, the electronic device generates the first key signal; and the operation object performs the first action in response to the first key signal.

Through implementation of the method provided in the first aspect, the electronic device may associate a remote control key specified by the user with a specific somatosensory action performed by the user, and then, after recognizing that the user performs the somatosensory action, the electronic device may obtain a control signal of the key based on the somatosensory action, to implement a same control effect as the key.

With reference to some embodiments of the first aspect, in some embodiments, after the electronic device associates the first key signal with the first action template, the method further includes: the electronic device displays a first interface, where the first interface displays an association relationship between the first action template and the first key.

Through implementation of the method provided in the foregoing embodiments, the user may intuitively see a specific remote control key and a specific somatosensory action that are associated with each other by the electronic device. Further, the user may complete the action to replace the remote control key.

With reference to some embodiments of the first aspect, in some embodiments, before the step in which the electronic device obtains a first action template, the method further includes: the electronic device obtains a first image including a user action; the electronic device recognizes skeleton nodes in the first image to obtain a first set of skeleton node data; after obtaining the first image, the electronic device obtains a second image including a user action; the electronic device recognizes skeleton nodes in the second image to obtain a second set of skeleton node data; the electronic device calculates a difference between the first set of skeleton node data and the second set of skeleton node data to obtain a threshold interval; and the electronic device generates the first action template, where the first action template includes the first set of skeleton node data and/or the second set of skeleton node data, and the threshold interval.

Through implementation of the method provided in the foregoing embodiments, the electronic device may obtain, twice, an image in which the user completes a somatosensory action, to learn a specific body posture in a process in which the user completes the somatosensory action, to generate an action template. The electronic device may recognize, by using the template, whether any action performed by the user is the somatosensory action.

With reference to the foregoing implementation, in some embodiments, a method in which the electronic device obtains the first image including the user action specifically includes: the electronic device collects a first image sequence in which the user completes a somatosensory action; and the electronic device determines, as the first image, an image frame having a smallest change amplitude of a somatosensory action of the user compared with a previous image frame in the first image sequence; and that the electronic device obtains a second image including a somatosensory action of the user specifically includes: the electronic device collects a second image sequence in which the user completes a somatosensory action; and the electronic device determines, as the second image, an image frame having a smallest change amplitude of a somatosensory action of the user compared with a previous image frame in the second image sequence.

Through implementation of the method provided in the foregoing embodiments, the electronic device may determine an image that can best reflect a somatosensory action from a plurality of collected images in which the user completes the somatosensory action as learning data for learning the somatosensory action. According to the foregoing selection process, in a process of learning and recognizing the somatosensory action of the user, the electronic device may also greatly reduce computing complexity, and save computing resources, to quickly and efficiently recognize the somatosensory action of the user.

With reference to some embodiments of the first aspect, in some embodiments, after the step in which the electronic device generates the first action template, the method further includes: the electronic device obtains a third image including a user action; the electronic device recognizes skeleton nodes in the third image to obtain a third set of skeleton node data; the electronic device determines that the third set of skeleton node data matches the first action template; and the electronic device locks the first action template.

Through implementation of the method provided in the foregoing embodiments, after an action template of an action is obtained by learning the somatosensory action, the electronic device may further determine whether the action template is correct. In this way, the electronic device can find, in time, whether a problem exists in a learning result of the electronic device.

With reference to the foregoing implementation, in some embodiments, a method in which the electronic device determines that the third set of skeleton node data matches the first action template specifically includes: the electronic device calculates a difference between the third set of skeleton node data and the first set of skeleton node data; and when the difference falls within the threshold interval, the electronic device determines that the third set of skeleton node data matches the first action template.

Through implementation of the method provided in the foregoing embodiments, when determining, through calculation, whether a somatosensory action performed by the user is consistent with an action template, the electronic device may perform comparison only once, that is, select an image that can best reflect the somatosensory action performed by the user, to match the action template. In this way, the electronic device can also greatly reduce computing complexity, and save computing resources, to quickly and efficiently recognize the somatosensory action of the user.

With reference to some embodiments of the first aspect, in some embodiments, the method further includes: the electronic device stores the first action template as a preset action template.

Through implementation of the method provided in the foregoing embodiments, after successfully learning a somatosensory action, the electronic device may not immediately match the somatosensory action with a remote control key, but perform matching when necessary. In this way, the user may separate processes of instructing the electronic device to learn a somatosensory action and match the somatosensory action with a remote control key, to increase flexibility of the learning and matching processes.

With reference to some embodiments of the first aspect, in some embodiments, that the electronic device obtains a first action template further includes: the electronic device displays a second interface, where the second interface displays a plurality of preset action templates for selection; and the electronic device selects the first action template from the plurality of preset action templates.

Through implementation of the method provided in the foregoing embodiments, the user may know specific learned somatosensory actions of the electronic device by using displayed content. Therefore, the user can directly use an existing action template of the electronic device to match a remote control key, to omit a process in which the electronic device learns a somatosensory action, thereby improving user experience.

With reference to some embodiments of the first aspect, in some embodiments, the method further includes: the electronic device learns a plurality of user actions of the user, and separately stores the plurality of user actions as a plurality of preset action templates, and/or the electronic device obtains a plurality of shared preset action templates.

Through implementation of the method provided in the foregoing embodiments, an action template obtained by the electronic device may not be limited to a local learning result. The electronic device may further obtain a shared learning template from another place.

With reference to some embodiments of the first aspect, in some embodiments, a method in which the electronic device selects the first action template from the plurality of preset action templates specifically includes: when recognizing that an action performed by the user matches the first action template, the electronic device selects the first action template from the plurality of preset action templates.

Through implementation of the method provided in the foregoing embodiments, the user may complete a somatosensory action displayed in a preset template, to select the template. In this way, the user can achieve a selection objective, and can further check whether the electronic device can accurately and quickly recognize an action performed by the user.

With reference to some embodiments of the first aspect, in some embodiments, after the step in which the electronic device obtains an image sequence including a user action, the method further includes: the electronic device obtains a fourth image from the image sequence; the electronic device recognizes skeleton nodes in the fourth image to obtain a fourth set of skeleton node data; the electronic device calculates a difference between the fourth set of skeleton node data and the first set of skeleton node data; and when the difference falls within the threshold interval, the electronic device recognizes that the action indicated by the image sequence matches the first action template.

Through implementation of the method provided in the foregoing embodiments, the electronic device may determine an image that can best reflect a somatosensory action from a plurality of collected images in which the user completes the somatosensory action as learning data for learning the somatosensory action, and then match the image with an action template, to recognize whether the action performed by the user is a learned action matched with a remote control key. In this way, the electronic device can also greatly reduce computing complexity, and save computing resources, to quickly and efficiently recognize the somatosensory action of the user.

According to a second aspect, an embodiment of this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method described in any one of the first aspect and the possible implementations of the first aspect.

According to a third aspect, an embodiment of this application provides a chip system. The chip system is applied to an electronic device. The chip system includes one or more processors. The processors are configured to invoke computer instructions, to enable the electronic device to perform the method described in any one of the first aspect and the possible implementations of the first aspect.

According to a fourth aspect, an embodiment of this application provides a computer program product including instructions. When the computer program product is run on an electronic device, the electronic device is enabled to perform the method describe in any one of the first aspect and the possible implementations of the first aspect.

According to a fifth aspect, an embodiment of this application provides a computer-readable storage medium, including instructions. When the instructions are run on an electronic device, the electronic device is enabled to perform the method described in any one of the first aspect and the possible implementations of the first aspect.

It may be understood that the electronic device provided in the second aspect, the chip system provided in the third aspect, the computer program product provided in the fourth aspect, and the computer storage medium provided in the fifth aspect are all configured to perform the method provided in embodiments of this application. Therefore, for beneficial effects that can be achieved by the electronic device provided in the second aspect, the chip system provided in the third aspect, the computer program product provided in the fourth aspect, and the computer storage medium provided in the fifth aspect, refer to the beneficial effects in the corresponding method. Details are not described herein again.

BRIEF DESCRIPTION OF DRAWINGS

FIG. 6A is a flowchart for matching a somatosensory action with a remote control key to control a game according to an embodiment of this application;

FIG. 6B is a flowchart in which an electronic device 100 learns a somatosensory action of a user according to an embodiment of this application;

DESCRIPTION OF EMBODIMENTS

Figure 1:
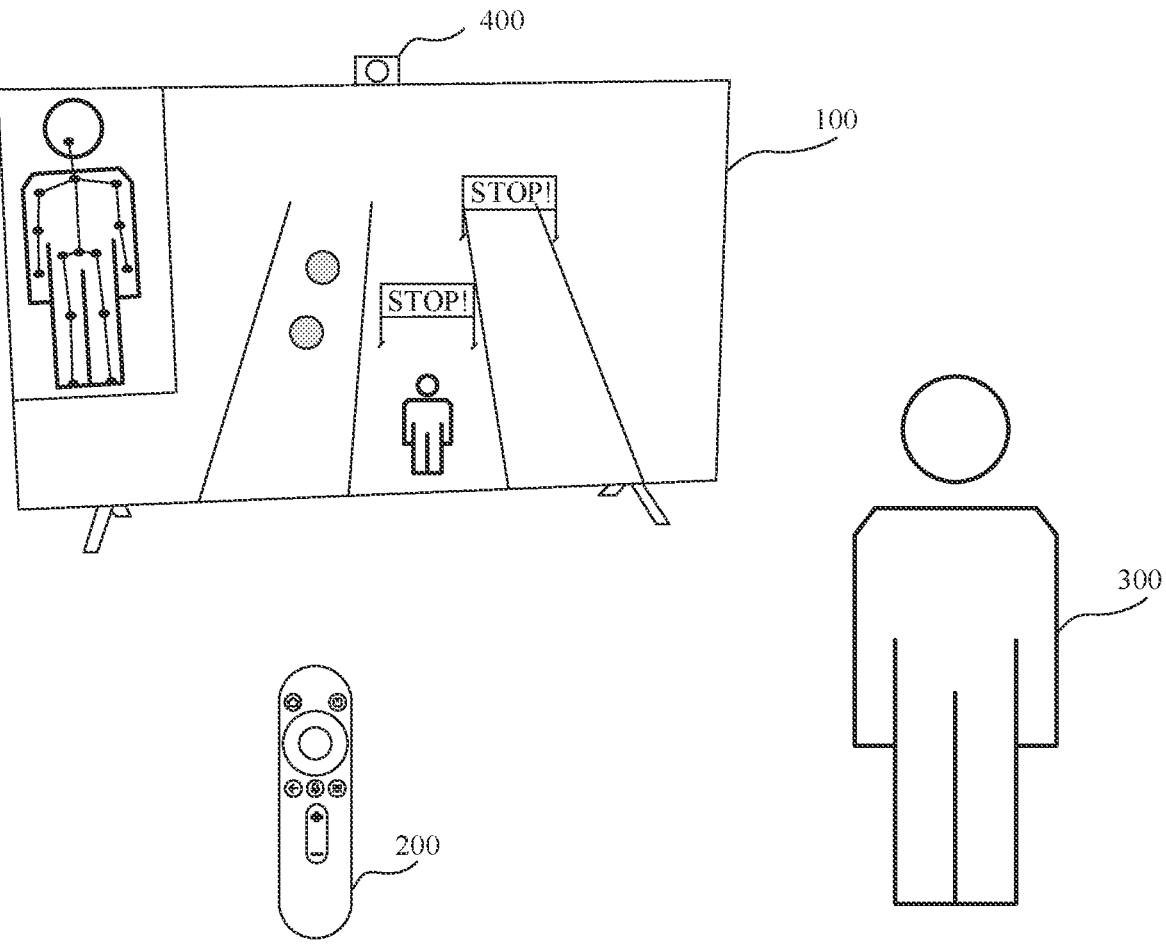
FIG. 1 is a diagram of a system of an application scenario according to an embodiment of this application.

Terms used in the following embodiments of this application are merely intended to describe specific embodiments, but are not intended to limit this application. As used in the specification and the appended claims of this application, singular expressions "one", "a", "the", "the foregoing", and "this" are also intended to include plural expressions, unless otherwise specified in the context clearly. It should be further understood that a term "and/or" used in this application indicates and includes any one or all of possible combinations of one or more listed items.

In the specification, claims, and accompanying drawings of this application, a term "user interface (user interface, UI)" is a medium interface for interaction and information exchange between an application or an operating system and a user, and implements conversion between an internal form of information and a receivable form of the user. A user interface of the application is source code written in a specific computer language, for example, Java or an extensible markup language (extensible markup language, XML). The source code of the interface is parsed and rendered on a terminal device, to be finally presented as user-recognizable content, for example, controls such as a picture, text, and a button. The control (control) is also referred to as a widget (widget) and is a basic element in the user interface. Typical controls include a toolbar (toolbar), a menu bar (menu bar), a text box (text box), a button (button), a scrollbar (scrollbar), a picture, and text. An attribute and content of the control in the interface are defined by using a tag or a node. For example, the control included in the interface is specified in the XML by using a node such as <Textview>, <ImgView>, or <VideoView>. One node corresponds to one control or one attribute in the interface. After being parsed and rendered, the node is presented as user-visible content. In addition, interfaces of many applications such as a hybrid application (hybrid application) usually further include web pages. The web page is also referred to as a page and may be understood as a special control embedded in an interface of an application. The web page is source code written in a specific computer language, for example, a hypertext markup language (hypertext markup language, GTML), a cascading style sheet (cascading style sheets, CSS), or JavaScript (JavaScript, JS). The source code of the web page may be loaded and displayed as user-recognizable content by a browser or a web page display component having a similar function to the browser. Specific content included in the web page is also defined by using a tag or a node in the source code of the web page. For example, an element and an attribute of the web page are defined in the GTML by using <p>, <img>, <video>, or <canvas>.

The user interface is commonly represented in a form of a graphical user interface (graphic user interface, GUI), and is a user interface that is related to a computer operation and that is displayed in a graphical manner. The user interface may be an interface element, such as an icon, a window, or a control, displayed on a display screen of an electronic device. The control may include a visible interface element, such as an icon, a button, a menu, a tab, a text box, a dialog box, a status bar, a navigation bar, or a widget.

Both exercise and a game can be performed in a somatosensory game. A user may also achieve an objective of exercising at home by using a somatosensory game, and the somatosensory game has relatively high fun. Therefore, exercise based on a somatosensory game can meet a user requirement of exercising at home, and can also improve home exercise fun, so that the user can stick to exercise for long time.

However, there are a relatively small quantity of existing somatosensory games, especially those that can be simply and conveniently obtained in an application market of a web television. Costs for developing a new somatosensory game are huge, and a game manufacturer often needs to perform independent customization work. Some customized somatosensory games can directly run by using existing hardware of a web television, but some other customized somatosensory games require specialized somatosensory devices. Therefore, this also limits wide use of the somatosensory game.

To resolve complex customization of the somatosensory game, lower a threshold of the somatosensory game, and enable all users having web televisions to experience the somatosensory game and complete daily exercise by using the somatosensory game, the present invention provides a method, a related apparatus, and a system for replacing a remote control instruction with a somatosensory action to control a conventional game to change the conventional game to a somatosensory game.

The method relates to an electronic device (for example, a web television) and a remote control. The electronic device may collect an image by using a camera. Through implementation of the method, the electronic device may recognize a specific somatosensory action completed by a user, and match the somatosensory action with a specific remote control key selected by the user, to simulate the remote control key to control a game operation.

Through implementation of the method, a conventional game (such as a Parkour game, Tetris, or Sokoban) can be simply and quickly transformed into a somatosensory game. In this process, a game manufacturer does not need to perform additional customization work, and the user does not need to use an additional somatosensory device. In addition, the user can exercise in a game process. Through implementation of the method, an exercise and fitness effect is achieved, and exercise fun is also increased, so that the user can stick to exercise for long time.

The following first describes a system 10 according to an embodiment of this application. FIG. 1 shows an example of a structure of the system 10. As shown in the figure, the system 10 includes an electronic device 100 and a remote control 200.

The electronic device 100 is a large-screen electronic device. The electronic device 100 includes but is not limited to a web television, a home projector, a large customized game interaction screen, or the like. An example embodiment of the electronic device 100 includes but is not limited to a portable electronic device on which iOS®, Android®, Harmony®, Windows®, Linux. or another operating system is mounted. The electronic device 100 has a camera 400. The camera 400 may be a camera fastened onto the electronic device 100, or may be a camera that establishes a connection to the electronic device 100 in a wired connection manner, a wireless connection manner, or the like, for example, a home smart camera.

The camera 400 may collect a real-time image, and send the image to the electronic device 100. When the camera 400 establishes a connection to the electronic device 100 in a wired connection manner, a wireless connection manner, or the like, the camera 400 may send the collected real-time image to the electronic device 100 by using a wired network or a wireless network. A wired connection is, for example, that the electronic device 100 is connected to the camera 400 by using a data cable. A wireless connection is, for example, a wireless fidelity (Wi-Fi) connection, a Bluetooth connection, an infrared connection, an NFC connection, or a ZigBee connection. This is not limited in this embodiment of this application.

The remote control 200 may be a physical remote control or a remote control application. The physical remote control is an entity remote control, for example, a television remote control shown in the figure. The remote control application is an application that is installed on an intelligent terminal and that can remotely control a specific device, for example, remote control applications that are of various air conditioners and that are provided by an application market. In this embodiment, the physical remote control is used as an example to describe a method for replacing a remote control key with a somatosensory action.

The remote control 200 may send a control signal to the electronic device 100. In response to a user operation acting on any remote control key, the remote control 300 may generate a control signal corresponding to the remote control key. The remote control 200 can send the control signal to a target device (the electronic device 100) by using a wireless transmission apparatus. The electronic device 100 has a remote control instruction receiving module. The module can receive and recognize the control signal generated by the remote control 200. In response to the control signal, the electronic device 100 may perform an operation indicated by the remote control key, for example, upward movement, downward movement, or determining.

The remote control 200 may be alternatively a remote control application installed on an intelligent terminal such as a mobile phone or a tablet computer. In this case, the remote control 200 may send the generated control signal to the target device through a wireless connection. In some embodiments, the intelligent terminal on which the remote control application is installed also has an infrared transmission function. Therefore, the remote control 200 may send the generated control signal to the electronic device 100 through an infrared connection. Details are not described herein.

In the system, the electronic device 100 may obtain, by using the camera 400, skeleton node data of a somatosensory action completed by the user 300. Based on the data, the electronic device 100 may recognize the specific somatosensory action of the user.

The electronic device 100 may associate a key operation of the remote control 200 with the specific somatosensory action of the user 300. After detecting a specific somatosensory action of the user 300, the electronic device 100 may query a remote control key associated with the action. Then, the electronic device 100 may simulate the remote control key to control a game application running on the electronic device 100.

Figure 2A:
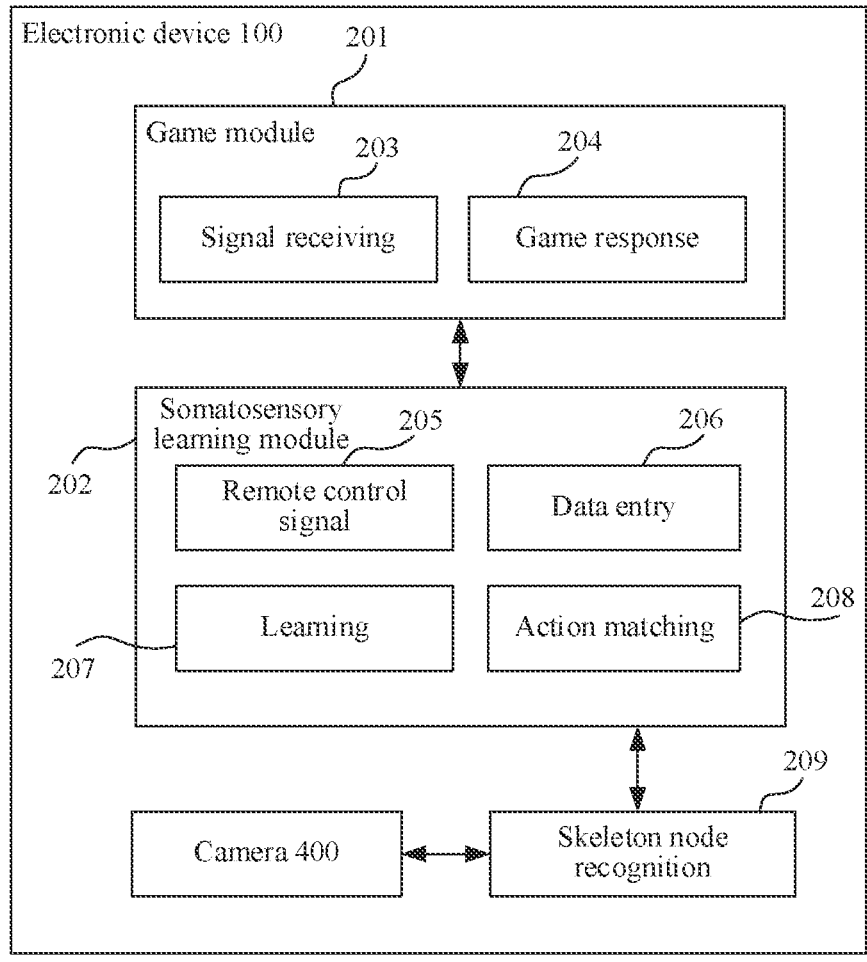
FIG. 2A is a diagram of a software framework of an electronic device 100 according to an embodiment of this application.

The following describes a diagram of a software framework of the electronic device 100 according to an embodiment of this application. FIG. 2A shows an example of a software framework structure of the electronic device 100. The camera 400 is a fastened component of the electronic device 100. As shown in FIG. 2A, the electronic device 100 may include a game module 201, a somatosensory learning module 202, and the camera 400.

The game module 201 may include a signal receiving module 203 and a game response module 204.

The signal receiving module 203 may be configured to receive a control signal for controlling a game operation. When a somatosensory mode is not enabled, the module may receive a control signal sent by the remote control 200. When the somatosensory mode is enabled, the module may receive a control signal sent by the electronic device 100 by simulating the remote control 200. That is, when the remote control is used to control a game operation, the signal receiving module 203 may receive a control signal sent by the remote control. After the electronic device 100 learns a specific somatosensory action for controlling the game operation, the electronic device 100 may recognize the somatosensory action, and then simulate the remote control 200 to send a control signal to the signal receiving module 203.

For example, in a Parkour game, after recognizing a somatosensory action corresponding to "up key" of the remote control 200, the electronic device 100 may generate a control signal (an analog signal) for simulating "up key". The signal receiving module 203 may receive the analog signal.

In response to various control signals received by the signal receiving module 203, the game response module 204 may control a game subject to perform corresponding actions. For example, in response to an "up key" control signal received by the signal receiving module 203, a runner in the game can perform an operation of jumping up. The "up key" control signal may be generated by the remote control 200, or may be generated by the electronic device 100 by simulating the remote control 200, that is, generated by the electronic device 100 after the electronic device 100 recognizes a somatosensory action corresponding to "up key" of the remote control 200 as described in the foregoing embodiment.

The somatosensory learning module 202 may include a remote control signal module 205, a data entry module 206, a learning module 207, and an action matching module 208. In addition, the electronic device 100 further includes the camera 400 and a skeleton node recognition module 209.

A capability of the remote control signal module 205 includes two parts: recording a control signal that is of a specific remote control key and that is sent by the remote control 200; and simulating the control signal.

Specifically, before or after the electronic device 100 obtains somatosensory action data of the user, the remote control signal module 205 may register a received control signal that is of a specific remote control key and that is sent by the remote control 200. After the electronic device 100 completes learning of the somatosensory action data of the user, the electronic device 100 may associate the registered control signal with the somatosensory action. That is, the electronic device 100 may record, by using the module, a control signal of a specific remote control key selected by the user.

After learning of a somatosensory action and matching with a control signal of a remote control key are completed, in the game, the remote control signal module 205 may simulate the control signal generated by the remote control key, to control the game. Specifically, after detecting a specific somatosensory action of the user, the electronic device 100 may query, based on a matching relationship between the somatosensory action and a control signal of a remote control key, the control signal that is of the remote control key and that is associated with the somatosensory action. Further, the remote control signal module 205 may simulate the control signal to control a game operation.

For example, the remote control signal module 205 may record a control signal of "up key" of the remote control 200. In response to a user operation for matching "up key" with a somatosensory action "jump", the electronic device 100 may associate a control signal of "up key" with the somatosensory action "jump". After recognizing that the user performs a somatosensory action "jump", the electronic device 100 may query, based on the action, the control signal that is of the remote control key "up key" and that matches the action, and then the electronic device 100 may simulate the control signal (generate an analog signal) to send a control command to the game. The analog signal can achieve a same control effect as the control signal generated by "up key" of the remote control, to achieve an objective of controlling a game operation.

The data entry module 206 may receive and store skeleton node data of the user. The data is obtained from the skeleton node recognition module 209. The skeleton node data includes data obtained in two periods: data obtained when a somatosensory action is learned, and data obtained when the game is performed. When the electronic device 100 learns the somatosensory action of the user, the data entry module 206 may send obtained data to the learning module 207. In a game process, the data entry module 206 may send obtained data to the action matching module 208.

The learning module 207 may learn the received skeleton node data based on a somatosensory action learning algorithm, and generate an action template. The action template is a set of data obtained by the electronic device 100 by learning the somatosensory action of the user, and includes skeleton nodes of the user and a threshold interval that are obtained when the action is completed. The action template may be used by the electronic device 100 to recognize an action performed by the user. For example, the electronic device 100 learns skeleton node data obtained when the user performs a "jump" action, to obtain an action template of the somatosensory action "jump". The template may be used as a reference for the electronic device 100 to determine whether an action performed by the user is a "jump" action.

The threshold interval may be used to determine, through measurement, whether a somatosensory action that participates in comparison is similar to that in the action template. Specifically, when a difference between skeleton node data of the compared action and data in the action template falls within a range indicated by the threshold interval, the electronic device 100 may consider that the compared action and the action indicated by the action template are a same action. The difference may be obtained through calculation by using the skeleton node data of the compared action and the skeleton node data in the action template. On the contrary, when the difference falls outside the range indicated by the threshold interval, the electronic device 100 considers that the action performed by the user is not the action in the action template.

The action matching module 208 may be configured to determine, through comparison, whether a somatosensory action of the user is similar to that in an action template. Specifically, the action matching module 208 may obtain, from the data entry module 206, skeleton node data of the user during the game. Then, the action matching module 208 may calculate a distance between the skeleton node data and that in the action template. When the distance falls within a threshold interval, the action matching module 208 may determine that the somatosensory action is similar to that in the action template. Further, the action matching module 208 may indicate the remote control signal module 205 to generate an analog signal, for example, a signal obtained by simulating "up key" of the remote control. On the contrary, when the distance falls outside the threshold interval, the electronic device 100 cannot recognize the somatosensory action completed by the user.

The camera 400 may collect an image that is of the user and that is obtained when the somatosensory action is completed, and process the image into image data that is in a specific format and that can be recognized by the skeleton node recognition module 209. The skeleton node recognition module 209 may extract skeleton node data of the user from the image sent by the camera 400. Further, the module may send the data to the somatosensory learning module 202 of the electronic device 100. Specifically, the data entry module 206 in the somatosensory learning module 202 receives and stores the skeleton node data.

In another embodiment, the skeleton node recognition module 209 may be alternatively disposed in the camera 400. This is not limited in this application.

It may be understood that the structure shown in this embodiment of this application does not constitute a specific limitation on the electronic device 100. In some other embodiments of this application, the electronic device 100 may include more or fewer modules than those shown in the figure, combine some modules, split some modules, or have different module arrangements.

In some other embodiments, the camera 400 may be alternatively a camera connected to the electronic device 100 in a wired network manner, a wireless network manner, or the like. Therefore, the electronic device 100 and the camera 400 shown in FIG. 2A may be alternatively independent modules. The electronic device 100 and the camera 400 may establish a connection by using a communication pipe and implement information exchange.

Figure 2B:
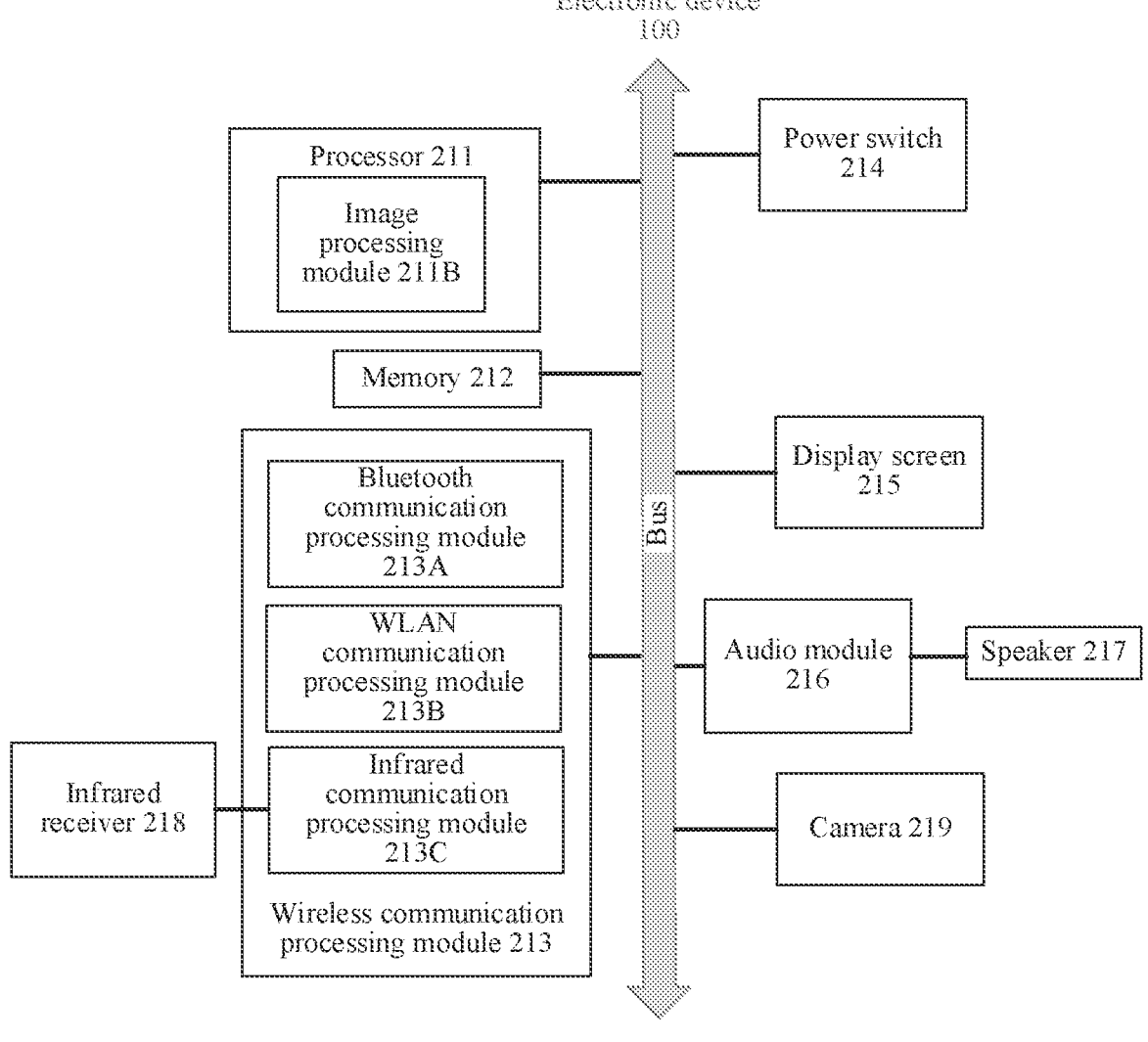
FIG. 2B is a diagram of a hardware structure of an electronic device 100 according to an embodiment of this application.

FIG. 2B shows an example of a hardware structure of the electronic device 100. As shown in FIG. 2B, the electronic device 100 may include a processor 211, a memory 212, a wireless communication processing module 213, a power switch 214, a display screen 215, an audio module 216, a speaker 217, an infrared receiver 218, and a camera 219.

The processor 211 may include one or more processing units. For example, the processor 211 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 211, and is configured to store instructions and data. In some embodiments, the memory in the processor 211 is a cache. The memory may store an instruction or data that is just used or cyclically used by the processor 211. If the processor 211 needs to reuse the instruction or the data, the processor 211 may directly invoke the instruction or the data from the memory. This avoids repeated access and reduces waiting time of the processor 211, thereby improving system efficiency.

The memory 212 is coupled to the processor 211, and is configured to store various software programs and/or a plurality of sets of instructions. The memory 212 may be configured to store computer-executable program code, and the executable program code includes instructions. The processor 211 runs the instructions stored in the memory 212, to perform various function applications of the electronic device 100 and data processing. The memory 212 may include a program storage area and a data storage area. The program storage area may store an operating system, an application required by at least one function (for example, a sound playing function or an image playing function), and the like. The data storage area may store data (for example, audio data or to-be-displayed image data) created in a process of using the electronic device 100, and the like. In addition, the memory 212 may include a high-speed random access memory, and may further include a nonvolatile memory, for example, at least one magnetic disk storage, a flash memory, or a universal flash storage (universal flash storage, UFS).

The wireless communication module 213 may provide a solution of wireless communication that is applied to the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology.

In some embodiments, the wireless communication processing module 213 may include a Bluetooth (BT) communication processing module 213A, a WLAN communication processing module 213B, and an infrared communication processing module 213C. One or more of the Bluetooth (BT) communication processing module 213A and the WLAN communication processing module 213B may obtain, through listening, a signal, such as a probe request or a scan signal, transmitted by another device, and may send a response signal, such as a probe response or a scan response, so that the another device can discover the electronic device 100, and the electronic device 100 can establish a wireless communication connection to the another device, to communicate with the another device by using one or more wireless communication technologies in Bluetooth or WLAN. The Bluetooth (BT) communication processing module 213A may provide a solution of Bluetooth communication including one or more of classic Bluetooth (BR/EDR) or Bluetooth low energy (Bluetooth low energy, BLE). The WLAN communication processing module 213B may provide a solution of WLAN communication including one or more of Wi-Fi direct, a Wi-Fi LAN, or a Wi-Fi SoftAP.

The power switch 214 may be configured to control power supply of a power supply to the electronic device 100. In some embodiments, the power switch 214 may be configured to control power supply of an external power supply to the electronic device 100.

The display screen 215 may be configured to display an image, a video, and the like. The display screen 215 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like.

The infrared receiver 218 may be configured to receive an infrared signal. For example, the infrared receiver 218 may receive a graphical infrared signal, such as a circular infrared signal, a ringlike infrared signal, or a cross infrared signal, sent by a remote control device.

The audio module 216 may be configured to convert a digital audio signal into an analog audio signal for output, or may be configured to convert analog audio input into a digital audio signal. The audio module 216 may be further configured to code and decode audio signals. In some embodiments, the audio module 216 may be disposed in the processor 211, or some functional modules of the audio module 216 may be disposed in the processor 211. The audio module 216 may transmit an audio signal to the wireless communication module 213 by using a bus interface (for example, a UART interface), to implement a function of playing an audio signal by using a Bluetooth sound box.

The speaker 217 may be configured to convert an audio signal sent by the audio module 216 into a sound signal.

In some embodiments, the electronic device 100 may further include a microphone, also referred to as a "mic" or a "mike" and configured to convert a sound signal into an electrical signal. When sending a voice control instruction, the user may make a sound through the mouth, to input a sound signal to the microphone.

The camera 219 may be configured to capture a static image or a video. An optical image is generated for an object through a lens, and is projected onto a photosensitive element. The photosensitive element may be a charge coupled device (charge coupled device, CCD) or a complementary metal-oxide-semiconductor (complementary metaloxide-semiconductor, CMOS) phototransistor. The photosensitive element converts an optical signal into an electrical signal, and then transmits the electrical signal to the image signal processor (image signal processor, ISP) for conversion into a digital image signal. The ISP outputs the digital image signal to the DSP for processing. The DSP converts the digital image signal into an image signal in a standard format such as RGB or YUV.

In some embodiments, the electronic device 100 may further include a wired local area network (local area network, LAN) communication processing module, a high definition multimedia interface (high definition multimedia interface, HDMI) communication processing module, and a universal serial bus (universal serial bus, USB) communication processing module. The wired LAN communication processing module may be configured to communicate, by using a wired LAN, with another device in the same LAN; or may be configured to be connected to a WAN by using a wired LAN, and may communicate with a device in the WAN. The HDMI communication processing module may be configured to communicate with another device by using an HDMI interface. For example, the HDMI communication processing module may receive, by using the HDMI interface, HDR video data sent by a set top box. The USB communication processing module may be configured to communicate with another device by using a USB interface.

In this embodiment of this application, the infrared receiver 218 may receive an infrared signal (a control signal used by the remote control 200 to control an operation of the electronic device 100) sent by the remote control 200. Further, the infrared communication processing module 213C processes the infrared signal received by the infrared receiver 218. The processor 211 may control a somatosensory learning algorithm, a somatosensory game, and a game animation processing process based on control information included in the infrared signal. The somatosensory learning algorithm and a somatosensory game application may be stored in the memory 212.

In a process of receiving a control signal of a specific remote control key selected by the user, the infrared receiver 218 and the infrared communication processing module 213C can record the control signal of the remote control key selected by the user. In another remote control process, in response to another operation performed by the electronic device 100 under control of the user, the two modules may control the electronic device 100 to display another user interface, for example, display all games installed on the electronic device 100, or play a video.

In some other embodiments provided in this embodiment of this application, when the remote control 200 is a remote control application installed on an intelligent terminal such as a mobile phone or a tablet computer, the electronic device 100 may receive and process, by using the Bluetooth (BT) communication processing module 213A and the WLAN communication processing module 213B, a control signal sent by the remote control 200.

The camera 219 may obtain an image or a video in which the user completes a somatosensory action. The graphics processing unit (GPU) and/or the neural-network processing unit (NPU) of the processor 211 may run a skeleton node recognition algorithm to obtain skeleton node data of the somatosensory action of the user in the image or the video. In some embodiments, the camera 219 may be alternatively an external camera connected to the electronic device 100 by using a network.

In a somatosensory learning process, one or more application processors (AP) of the processor 211 may run a somatosensory learning algorithm to generate an action template. In a game process, one or more application processors (AP) of the processor 211 may run the somatosensory learning algorithm to recognize a somatosensory action of the user, and then match the somatosensory action with a control signal of a remote control key and simulate the control signal, to control a game operation.

Based on the foregoing method, the user may complete a specific somatosensory action to control a game operation. The following describes some user interfaces provided in embodiments of this application. FIG. 3A to FIG. 3I show an example of a set of user interfaces used by the electronic device 100 to learn a customized somatosensory action of the user. FIG. 4A to FIG. 4D show an example of a set of user interfaces used by the electronic device 100 to recognize a customized somatosensory action of the user to control a game.

Figure 3A:
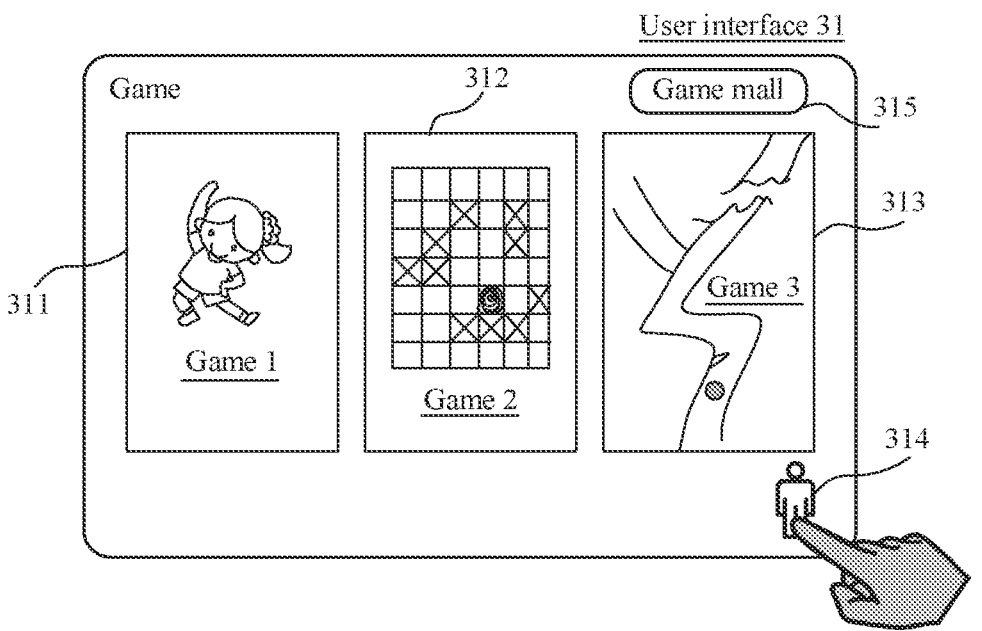
FIG. 3A to FIG. 3I, FIG. 4A to FIG. 4D, and FIG. 5A to FIG. 5C are sets of user interfaces according to embodiments of this application.

FIG. 3A shows an example of a user interface 31 in which the electronic device 100 displays installed games in a game mode. The user interface 31 may include some option controls and a somatosensory setting control.

The option controls may be used to display covers of the games. The user may know content of the games by using the covers. For example, in FIG. 3A, an option control 311 may indicate a Parkour game. One option control corresponds to one game. The user interface 31 may display one or more option controls based on a quantity of installed games. Three games shown in the figure are used as an example. The user interface 31 further includes an option control 312 and an option control 313.

The user may browse, by using the remote control, all the games installed on the electronic device 100. In some other embodiments, the user may alternatively search for a desired game in a voice input manner. The electronic device 100 may detect a user operation acting on an option control, and the electronic device 100 may display a game interface of a game in response to the operation.

In some embodiments, the user interface 31 may further include a control 315. The control 315 may be used by the electronic device 100 to obtain more games.

A somatosensory control 314 may be used to display a somatosensory setting page. The somatosensory setting page may be used to display learned somatosensory actions of the electronic device 100 and matching relationships. When the electronic device 100 detects a user operation acting on the somatosensory control 314, in response to the operation, the electronic device 100 may display a somatosensory setting page shown in FIG. 3B.

It may be understood that the user interface 31 is an example game page of the electronic device 100, and should not constitute a limitation on this embodiment of this application.

Figure 3B:
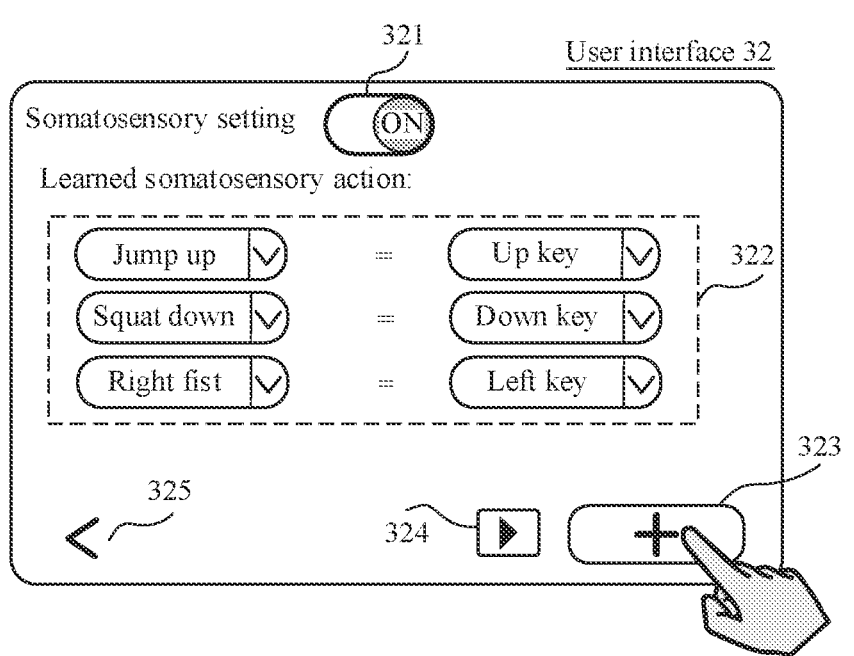
Figure 3C:
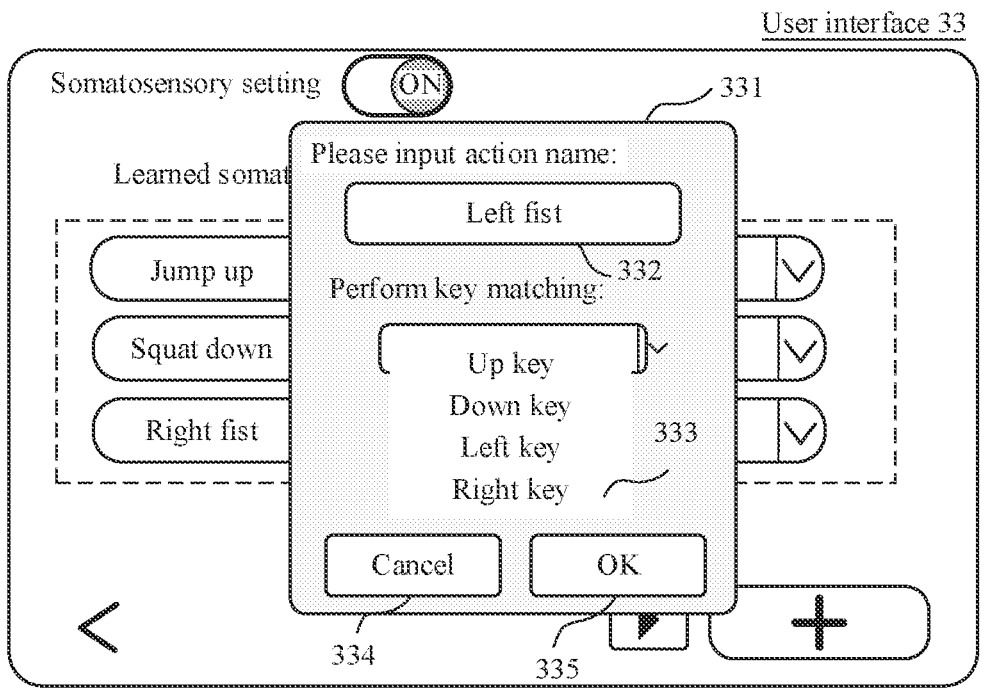

FIG. 3B shows an example of a user interface 32 used by the electronic device 100 to display learned somatosensory actions and matching relationships. The user interface 32 may include an on/off control 321, an area 322, an add control 323, and a return control 325.

The on/off control 321 may be used to indicate whether the electronic device 100 enables a somatosensory control mode. As shown in the figure, an "ON" symbol displayed by the on/off control 321 may indicate that the electronic device 100 has enabled the somatosensory control mode. In the somatosensory control mode, any game is entered, and the electronic device 100 may recognize a current body action of the user based on the matching relationships indicated in the area 322, to control the game. The electronic device 10 may detect a user operation acting on the on/off control 321, and in response to the operation, the on/off control 321 may display an "OFF" symbol, and therefore the somatosensory control mode is exited. After exiting the somatosensory control mode, the electronic device 100 receives a control signal sent by the remote control 200, to achieve an objective of controlling a game operation.

The area 322 may be used to display the learned somatosensory actions of the electronic device 100 and a remote control operation that each somatosensory action matches. As shown in the figure, the learned somatosensory actions of the electronic device 100 are, for example, "jump up", "squat down", and "right fist", where "jump up", "squat down", and "right fist" respectively match "up key", "down key", and "left key" in remote control keys. For example, in a Parkour game, when the electronic device 100 recognizes that the user completes a "jump up" action, the electronic device 100 may simulate "up key" of the remote control to control a runner in the game to jump up.

When the on/off control indicates that the somatosensory control mode is enabled, the matching relationships that are between the remote control keys and the somatosensory actions and that are indicated in the area 322 are applicable to any game displayed in the user interface 31. After entering the game, the electronic device 100 may enable the camera 400 to obtain a somatosensory action of the user, to control a game operation.

In some other embodiments, the foregoing somatosensory action setting process may be alternatively completed after a game is entered. In other words, after the user enters a game, the electronic device 100 may display the user interface 32 shown in FIG. 3B. The user may set matching relationships between remote control keys and somatosensory actions in the game by using the page.

In another embodiment, the electronic device 100 may display the user interface shown in FIG. 3B both before entering a game and after entering the game. Before entering the game, the user may set mapping relationships between remote control keys and somatosensory actions in the game by using the interface. After entering the game, the user may further adjust the set matching relationships by using the interface, and the like. This is not limited in this application.

The return control 325 may be used to close the user interface 32. In response to a user operation acting on the return control 325, the electronic device 100 may display a user interface, for example, the user interface 31. The add control 323 may be used by the electronic device 100 to learn a new somatosensory action. When detecting a user operation acting on the add control 323, in response to the operation, the electronic device 100 may display a user interface 33 shown in FIG. 3C.

In some embodiments, the user interface 32 may further include a play control 324. The play control 324 may be used to display the learned somatosensory actions of the electronic device 100. The user may know specific body forms of the somatosensory actions by using videos.

The user interface 33 may include a dialog box 331. The dialog box 331 may be used to record remote control keys selected by the user and a name of a to-be-learned somatosensory action of the electronic device 100. The name may be used to mark the somatosensory action. For example, the user may input a name "left fist" in a window 332 in the dialog box 331, and then choose to match a somatosensory action indicated by the name "left fist" with "right key" in the remote control keys.

In some embodiments, the user may select, by using a scroll control, a remote control key that the somatosensory action needs to match. Refer to a scroll control 333 in FIG.

3C. In some other embodiments, the electronic device 100 may further directly record a next remote control key operation of the user after the user completes name input, and use, as a remote control key that the somatosensory action matches, a key used in the key operation. This is not limited in this application.

In some embodiments, the electronic device 100 may alternatively first learn a somatosensory action, and then receive a remote control key selected by the user. This is not limited in this embodiment of this application.

The dialog box 331 further includes a cancel control 334 and an OK control 335. After detecting a user operation acting on the cancel control 334, in response to the operation, the electronic device 100 may display the user interface 32 shown in FIG. 3B, in other words, close the dialog box 331. After detecting a user operation acting on the OK control 335, in response to the operation, the electronic device 100 may display a user interface 34 shown in FIG. 3D.

Figure 3D:
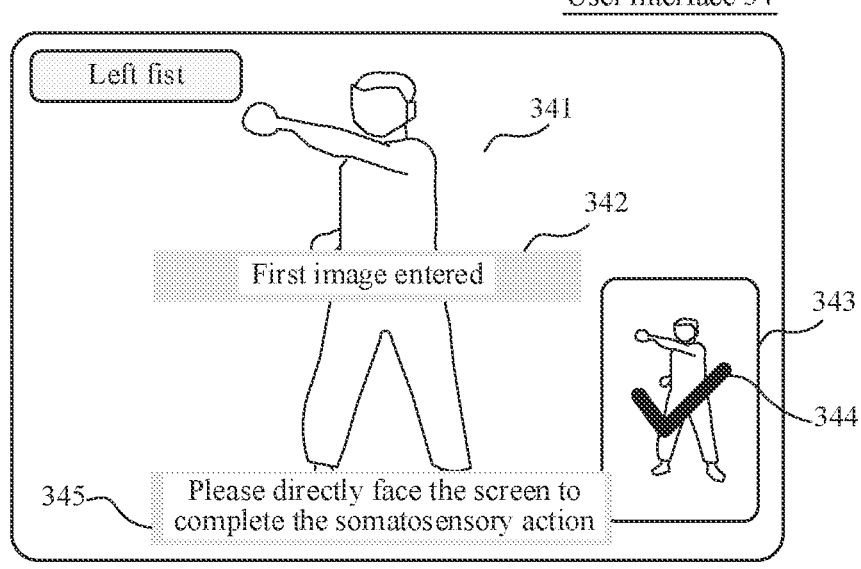

FIG. 3D shows an example of the user interface 34 used by the electronic device 100 to obtain a first image of a customized somatosensory action of the user. As shown in the figure, the user interface 34 may include a window 341, a prompt window 342, a window 343, and a prompt window 345.

The window 341 may be used to display an image captured by the camera 300 in real time. The window 343 may be used to display a first image that is of a customized somatosensory action and that is locked by the electronic device 100. The first image is an image obtained when the user is relatively static when completing a somatosensory action. For example, in a process in which the user completes a left fist action shown in FIG. 3D, the user generates a series of body forms. Finally, the action is frozen, for long time, in a form shown in the window 341. In this case, an image including the body form may be referred to as the first image. Then, the electronic device 100 may display the first image in the window 343. In another embodiment, alternatively, after recognizing skeleton nodes in the first image, the electronic device 100 may display, in the window 343, the first image including the skeleton nodes. Alternatively, in another optional manner, the electronic device 100 may directly display, in the window 343, the skeleton nodes obtained by recognizing the first image. This is not limited in this application.

Determining of the first image may be completed through static detection. A static detection process is specifically described in subsequent embodiments, and details are not described herein. In some embodiments, the first image displayed in the window 343 may further display the skeleton nodes of the user.

Specifically, when the electronic device 100 enters a state of learning a somatosensory action, that is, displays the user interface 34, the electronic device 100 may invoke the camera 400 to collect a real-time image. The electronic device 100 may display, in the window 341, the real-time image collected by the camera 400.

In addition, the electronic device 100 may display the prompt window 345 to prompt the user to directly face the electronic device 100 to complete the somatosensory action. Then, the electronic device 100 may detect whether a somatosensory action in the window 341 is in a static state. After detecting that the somatosensory action is in the static state, the electronic device 100 may lock, in the window 343, an image displayed in the window 341 in this case. The somatosensory action indicated in the locked image (a first image) is a specific somatosensory action recognized by the electronic device 100. Skeleton nodes in the somatosensory action are a first set of skeleton node data (a first set of data) obtained by the electronic device 100.

After locking the first image, the electronic device 100 may further display a symbol 344 to prompt the user that the first image has been recognized. In some embodiments, the symbol 344 may be alternatively text, for example, "recognized" or "passed". This is not limited in this application.

When displaying the symbol 344, the electronic device 100 may further display the prompt window 342. The prompt window 342 may be used to prompt the user that collection of the first image of the somatosensory action is completed. After displaying the prompt window 342 for a period of time, the electronic device 100 may display a user interface 35 shown in FIG. 3E. The period of time may be a time interval, for example, 3 seconds or 7 seconds. In some embodiments, a dedicated control, for example, an OK control, may be further set in the prompt window 342. In response to a user operation acting on the control, the electronic device 100 may display the user interface 35 shown in FIG. 3E.

Figure 3E:
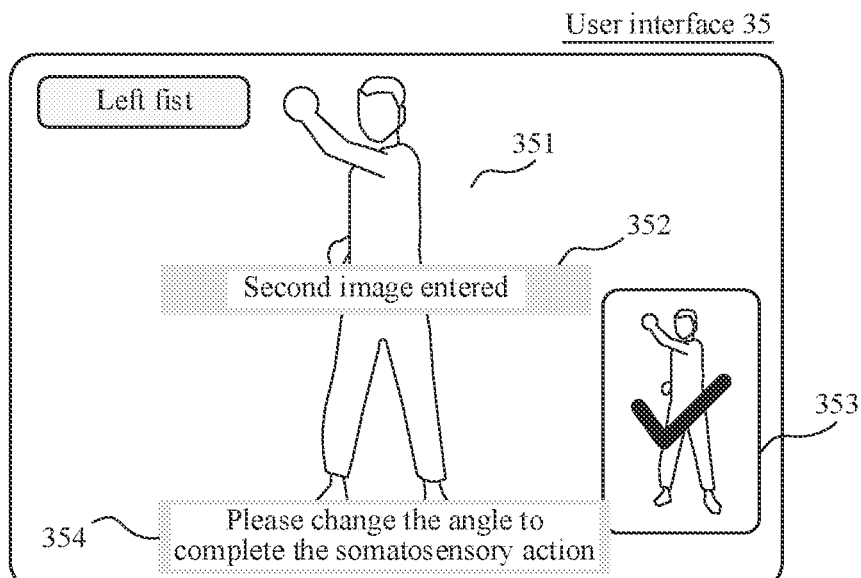

FIG. 3E shows an example of the user interface 35 used by the electronic device 100 to obtain a second image of the customized somatosensory action of the user. The user interface 35 may include a window 351, a prompt window 352, a window 353, and a prompt window 354.

After the electronic device 100 completes collection of the first image, the electronic device 100 may display the prompt window 354. The prompt window 354 may prompt the user to rotate the body by a specific angle to enable a side of the body to face the electronic device 100, and then re-complete the foregoing somatosensory action.

Likewise, the electronic device 100 may detect whether a somatosensory action in the window 351 is in a static state. After detecting that the somatosensory action is in the static state, the electronic device 100 may lock, in the window 353, an image displayed in the window 351 in this case. In this case, the locked image is a second image that is about the somatosensory action and that is obtained by the electronic device 100. Skeleton nodes that are used by the user to complete the somatosensory action and that are obtained by recognizing the second image are a second set of skeleton node data (a second set of data) obtained by the electronic device 100.

In a process of obtaining the second image, the electronic device 100 may check the angle at which the user rotates the body. In other words, in a process in which the user rotates the body, the user does not need to control a specific rotation angle. The electronic device 100 may determine, based on the skeleton node data in the second image obtained after the user rotates, whether the user rotates the body at an excessively large angle. Specifically, after obtaining the second image, the electronic device 100 may first recognize a key limb indicated in the second image. When the key limb changes, the electronic device 100 may consider that the second image is incorrect. Further, the electronic device 100 may prompt the user that the second image is not successfully entered, and indicate the user to re-rotate the body and complete the foregoing action, to obtain a new second image.

For example, when a rotation angle of the user is 90°, recognition effects of a same action are completely different. In this case, the electronic device 100 recognizes that a left leg and a right leg of the user basically overlap, and the left key and the right key basically overlap. Therefore, the electronic device 100 may consider that the user rotates the body in an excessively large range. The key limb is a limb that plays a main distinguishing role in a process of recognizing an action. The key limb is specifically described in subsequent embodiments, and details are not described herein.

After locking the second image, the electronic device 100 may display a symbol "check mark" and the prompt window 352. The prompt window 352 may prompt the user that the second image has been entered.

Figure 3F:
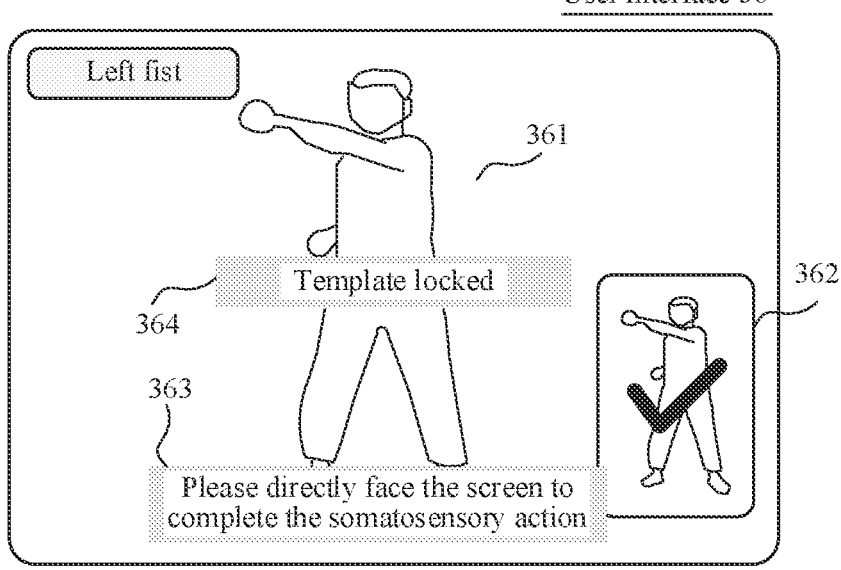

Likewise, after displaying the prompt window 352, the electronic device 100 may display a user interface 36 shown in FIG. 3F. The user interface 36 may include a prompt window 363, a window 362, a prompt window 363, and a prompt window 364.

The prompt window 363 may prompt the user to directly face the electronic device 100 and re-complete the foregoing somatosensory action. In a process in which the user re-completes the foregoing action, the window 361 may display, in real time, an image collected by the camera 400. Likewise, after detecting that a somatosensory action in the window 361 is in a static state, the electronic device 100 may lock, in the window 362, an image displayed in the window 361 in this case.

In this case, the image locked in the window 362 is a third image that is of the somatosensory action and that is obtained by the electronic device 100. Skeleton nodes in the somatosensory action are a third set of skeleton node data (a third set of data) obtained by the electronic device 100.

When determining that the somatosensory action in the third image is similar to the action in the first image, the electronic device 100 may display the prompt window 364, to prompt the user that learning of the somatosensory action is completed. Then, the electronic device 100 may display a user interface 38 shown in FIG. 3H. On the contrary, when determining that the somatosensory action in the third image is not similar to the action in the first image, the electronic device 100 may display a user interface 37 shown in FIG. 3G. The user interface 37 may prompt the user that there are relatively large differences between the action performed by the user for the third time and the actions learned for two previous times, and the electronic device 100 cannot recognize the action performed by the user for the third time.

In some embodiments, the electronic device 100 may alternatively directly indicate the user to directly face the screen to complete the somatosensory action three times. In a process of completing the somatosensory action three times, the electronic device 100 may obtain three sets of skeleton node data, to learn the action.

Figure 3G:
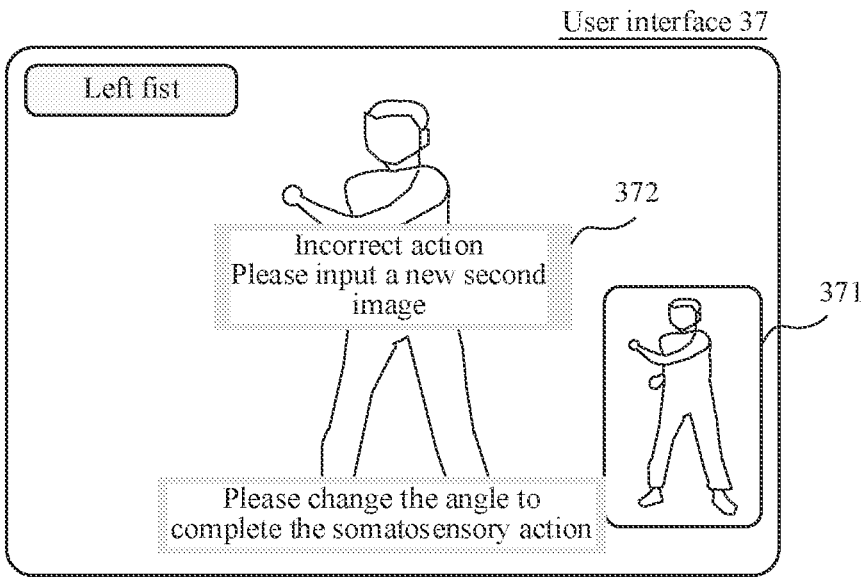

FIG. 3G may include a window 371 and a prompt window 372. The prompt window 372 may prompt the user that the action is incorrect, and prompt the user to enter a new second image. Refer to the user interface 35. In some embodiments, the prompt window 372 may alternatively prompt the user to record a new third image. After the entered new third image is similar to the first image, the electronic device 100 also prompts the user that learning of the somatosensory action is completed.

Figure 3H:
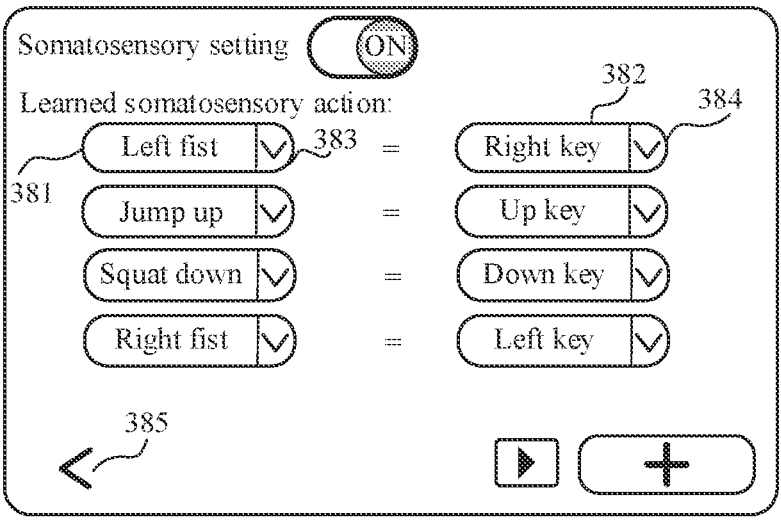
Figure 3I:
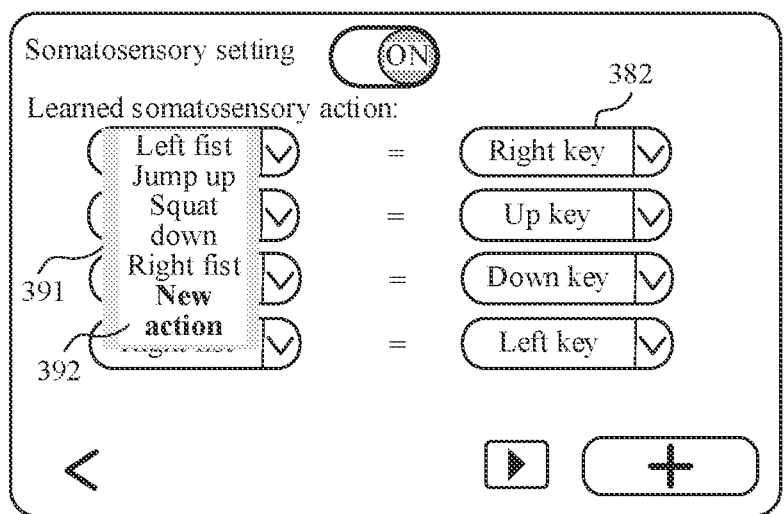

As shown in FIG. 3H, the user interface 38 may include a control 381 and a control 382. The control 381 may display a name of the somatosensory action learned by the electronic device 100 in FIG. 3D to FIG. 3F. The control 382 may display a name of a remote control key replaced with the somatosensory action.

After the electronic device 100 learns a new somatosensory action by using the processes in FIG. 3D to FIG. 3F, the user interface 38 may display a name of the somatosensory action learned by the electronic device 100, and display, behind the name of the somatosensory action, a name of a remote control key that matches the somatosensory action, to indicate a replacement relationship between the somatosensory action and the remote control key to the user.

In some embodiments, the electronic device 100 may further support adjustment of a matching relationship between a learned somatosensory action and a remote control key. For example, the electronic device 100 may set a selection button, for example, a control 383, behind a name of the somatosensory action. After detecting a user operation acting on the control 383, the electronic device 100 may display all learned somatosensory actions, as shown in a window 391 in FIG. 3I. Then, the user may select any learned somatosensory action to match the remote control key in the control 382. For example, the user may select a "squat down" action to match the right key of the remote control.

The window 391 may further include a control 392. The control 392 may be used by the electronic device 100 to learn a new somatosensory action, and match the action with the remote control key represented by the control 382. For example, in response to a user operation acting on the control 392, the electronic device 100 may display the user interfaces shown in FIG. 3D to FIG. 3F. Through implementation of the method shown in the foregoing user interfaces, the electronic device 100 may learn a new somatosensory action. After a learning process ends, the electronic device 100 may add a new action to the control 392, and match the action with the remote control key represented by the control 382. Specifically, the electronic device 100 associates a learning template obtained by learning the action with a control signal of the remote control key.

Likewise, the electronic device 100 may also set a selection button, for example, a control 384, behind a name of the remote control key. In this way, the user may also choose to change the remote control key that the somatosensory action motion matches.

Generally, there is a one-to-one correspondence between somatosensory actions and remote control keys, that is, one somatosensory action matches only one remote control key, and one remote control key is also replaced with only one somatosensory action. In some embodiments, the electronic device 100 may also support a case in which a plurality of somatosensory actions match one remote control key. However, one somatosensory action cannot replace a plurality of remote control keys.

The electronic device 100 may detect a user operation acting on a return control 385, and the electronic device 100 may display the user interface 31 in response to the operation. Then, when detecting a user operation acting on an option of a game, the electronic device 100 may display a game interface of the game. For example, when detecting a user operation acting on the control 314, in response to the operation, the electronic device 100 may display a user interface 41 shown in FIG. 4A.

Figure 4A:
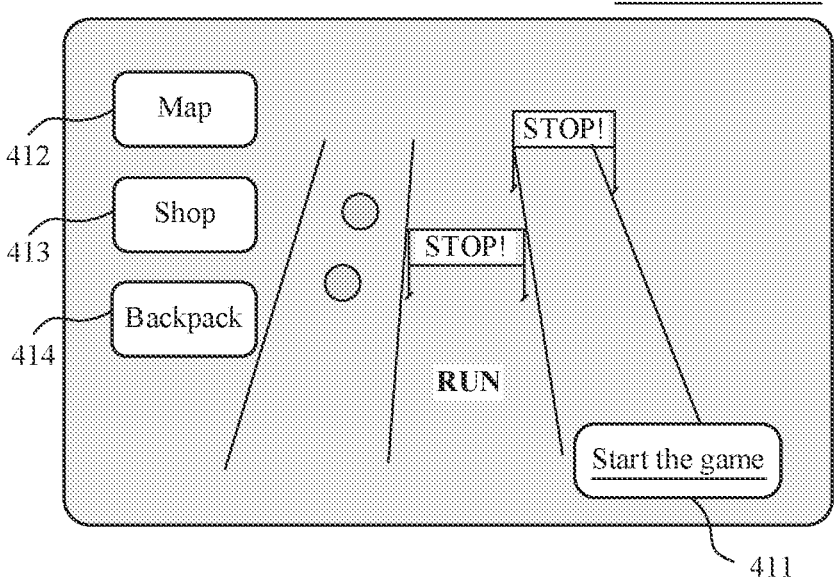

FIG. 4A shows an example of the user interface 41 displayed before the Parkour game starts. The user interface 41 may include a start control 411. After detecting a user operation acting on the start control 411, the electronic device 100 may display a user interface shown in FIG. 4B. The user interface 41 may further include some game setting controls, for example, a control 412 for selecting a game map, a control 412 for purchasing an item, and a control 414 for viewing game role equipment. Details are not described herein.

Figure 4B:
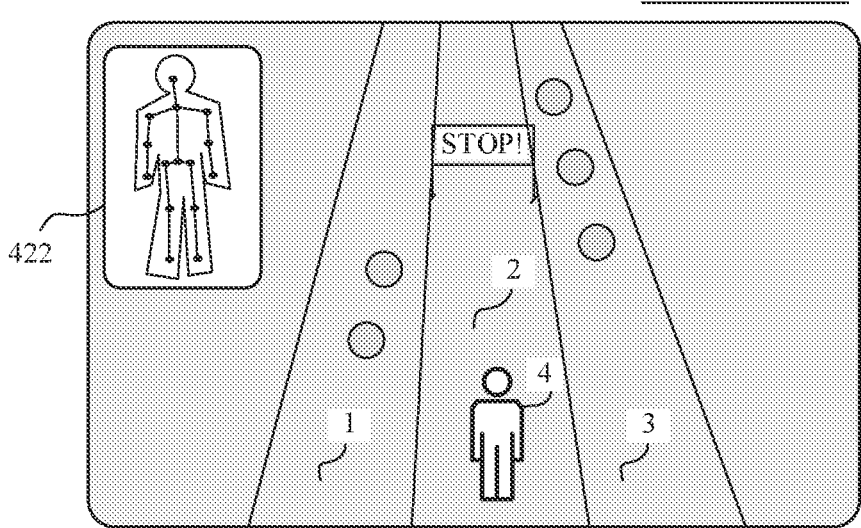
Figure 4C:
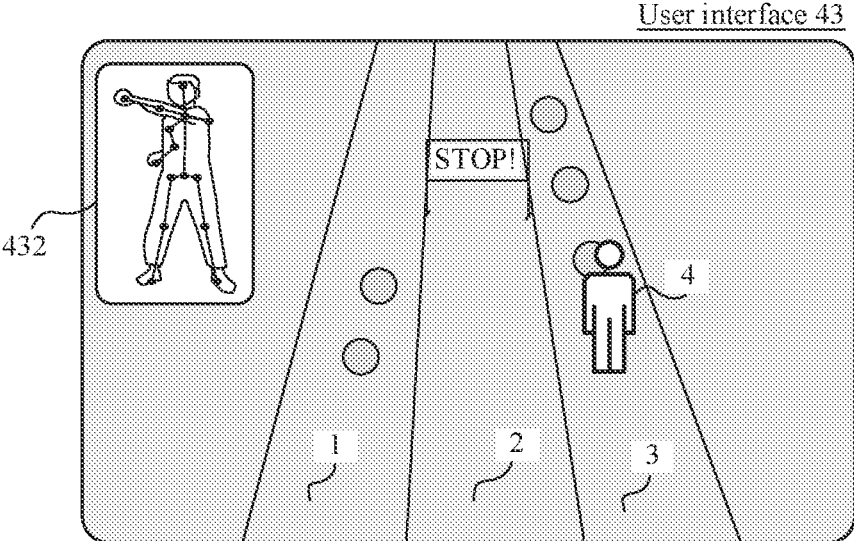

FIG. 4B and FIG. 4C show an example of a set of user interfaces used by the electronic device 100 to recognize a somatosensory action of the user in the Parkour game to control a game operation.

As shown in FIG. 4B, the user interface 42 may include a runway 1, a runway 2, a runway 3, an operation object 4, and a window 422. The window 422 may display a body form that is of the user and that is currently obtained by the electronic device 100 by using the camera 400.

At a subsequent moment, the electronic device 100 may obtain a specific somatosensory action of the user, and then the electronic device 100 may search for a remote control key associated with the somatosensory action. Further, the electronic device 100 may simulate the key to control the operation object in the game to generate a corresponding action. As shown in a window 432 in a user interface 43, the electronic device 100 may obtain a "left fist" action performed by the user. In this case, the electronic device 100 may recognize that the somatosensory action is a learned "left fist" action. Based on an association relationship between the "left fist" action and the right key of the remote control, the electronic device 100 may simulate the right key to control the operation object 4 in the game to move rightward, that is, move from the runway 2 in the user interface 42 to the runway 3 in the user interface 43.

Figure 4D:
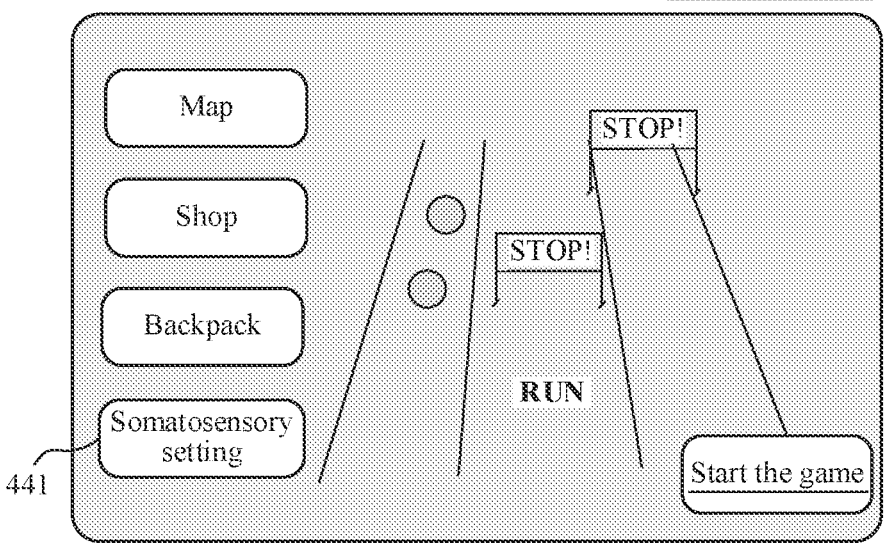

In some embodiments, the electronic device 100 may further set a somatosensory setting control on a game start page, for example, a control 441 shown in FIG. 4D. In response to a user operation acting on the control 441, the electronic device 100 may display a somatosensory setting page, as shown in FIG. 3B. Then, for example, the user may view learned somatosensory actions of the electronic device 100 and matching relationships in somatosensory setting, and indicate the electronic device 100 to learn a new somatosensory action. For details, refer to FIG. 3B to FIG. 3I.

An embodiment of this application further provides another method for replacing a remote control key with a somatosensory action to control a game operation. In the method, the electronic device 100 may first learn a customized somatosensory action of the user, and generate an action template. Then, in a process in which the user needs to establish a matching relationship between a somatosensory action and a remote control key, the electronic device 100 may display the action template for selection by the user. The learned action template for which no matching relationship is established with a specific remote control key is a preset template. In a selection process, the user may complete a somatosensory action in a preset template to select the template, and then establish a matching relationship between the somatosensory action and a remote control key. In a game, when detecting that the user performs the action in the preset template, the electronic device 100 may match the action with the remote control key, to control the game.

Figure 5A:
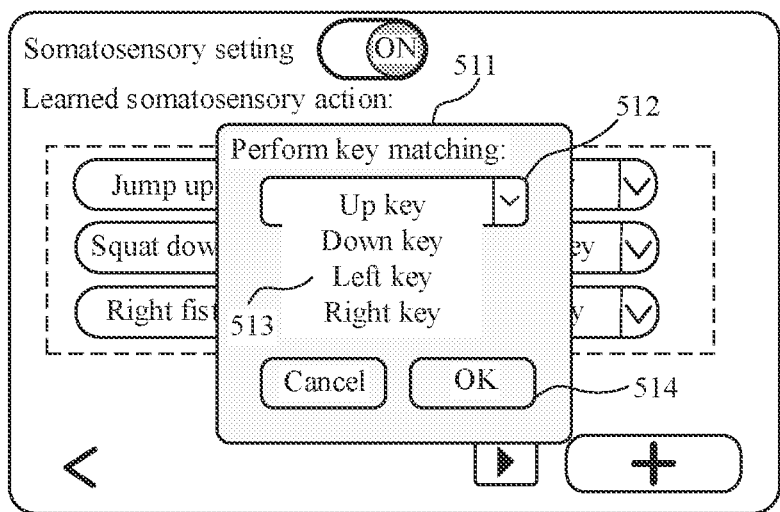
Figure 5B:
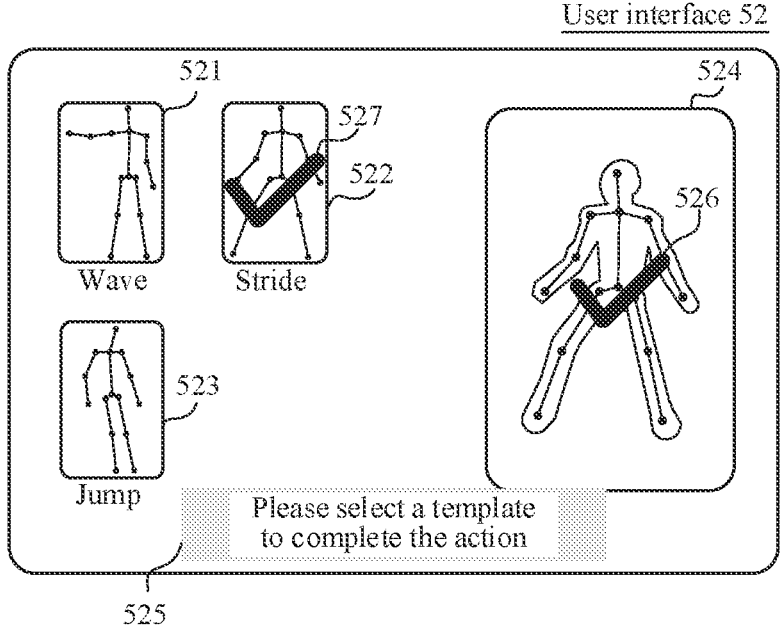
Figure 5C:
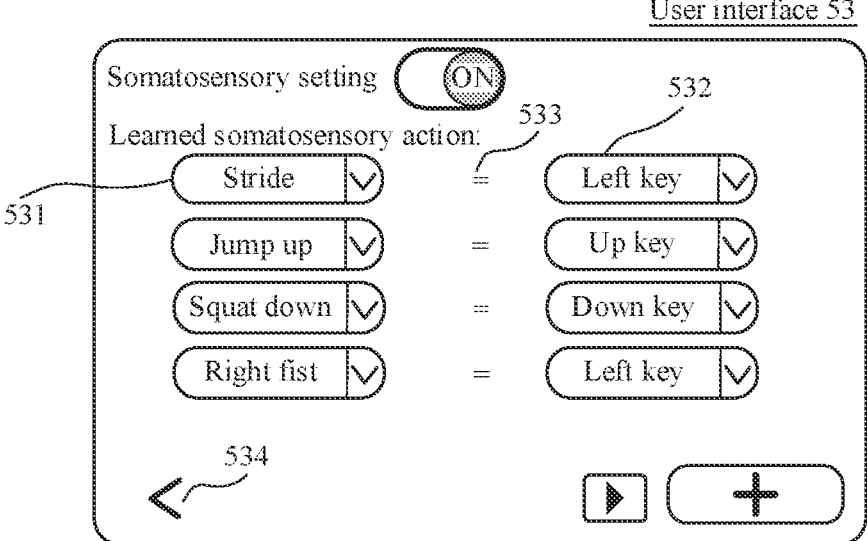

FIG. 5A to FIG. 5C are a set of user interfaces for implementing the foregoing method according to an embodiment of this application. Specifically, when detecting a user operation acting on the add control 323 in the user interface 32, in response to the operation, the electronic device 100 may further display a user interface 51 shown in FIG. 5A.

The user interface 51 may include a dialog box 511. The dialog box 511 may record a replaced remote control key selected by the user. In response to a user operation acting on a selection control 512, the electronic device 100 may display a scroll control 513. The scroll control 513 may sequentially display keys of the remote control. The user may select one of the keys as the replaced remote control key. Likewise, the electronic device 100 may further support another manner of selecting a specific remote control key. Refer to the description in FIG. 3C. Details are not described herein again.

After the user selects a remote control key, for example, the left key, the user may determine the option by using an OK control 514. The electronic device 100 may detect the remote control key selected by the user and the determining operation, and in response to the operation, the electronic device 100 may display a user interface 52 shown in FIG. 5B.

FIG. 5B shows an example of a user interface used by the electronic device 100 to receive a preset template that is of a somatosensory action and that is selected by the user. As shown in the figure, the user interface 52 may include a preset template 521, a preset template 522, a preset template 523, a window 524, and a prompt window 525.

The preset template 521, the preset template 522, and the preset template 523 are all somatosensory action templates preset by the electronic device 100. The preset templates may display learned somatosensory actions of the electronic device 100. That is, a somatosensory action that is of the user and that is learned by the electronic device 100 with reference to the processes in FIG. 3A to FIG. 3I may also be stored as an action template. When a remote control key needs to be matched, the electronic device 100 may invoke the template. It may be understood that, in specific practice, the user interface 52 may display more or fewer preset templates. This is not limited in this embodiment of this application. The window 524 may display an image collected by the camera 300. The prompt window 525 may be used to prompt the user how to complete an operation of selecting a preset template.

First, the user may know, by using the preset template 521, the preset template 522, and the preset template 523, specific somatosensory actions included in the preset templates. Then, the user may complete any one of the plurality of templates based on the prompt in the prompt window 525. The camera 400 may collect, in real time, an image in a process in which the user completes a somatosensory action, and send the image to the electronic device 100. The electronic device 100 may display the image in the window 524. In addition, the electronic device 100 may calculate differences between a somatosensory action indicated in the image and the actions in the preset templates, to recognize a specific template and a specific somatosensory action completed by the user. For example, the electronic device 100 recognizes that the user completes a "stride" action in the preset template 522. After recognition succeeds, the electronic device 100 may display a mark 526 in the window 524, and also display a mark 527 in the preset template 522.

In this case, the electronic device 100 completes a process of receiving the preset template that is of the somatosensory action and that is selected by the user. Then, the electronic device 100 may display a user interface 53 shown in FIG. 5C.

In the user interface 53, an area 531 may display a name of the preset template selected by the user, an area 532 may display a name of the remote control key selected by the user, and a correspondence between the preset template and the remote control key is indicated to the user by using an "equal" symbol 533.

Then, the user may exit the somatosensory setting page by using a return control 534. In response to a user operation acting on the return control 534, the electronic device 100 may display the user interface 31 shown in FIG. 3A Then, the user may select any game. In the game, the electronic device 100 may recognize a somatosensory action of the user, match the action with a preset template, and further match the somatosensory action with a replaced remote control key by using a matching relationship in somatosensory setting, to control a game operation.

Likewise, in another embodiment, the electronic device 100 may first receive a preset template that is of a somatosensory action and that is selected by the user, and then the electronic device 100 may receive a remote control key selected by the user. This is not limited in this embodiment of this application.

In another embodiment, a preset template displayed by the electronic device 100 may be alternatively downloaded from the Internet, in other words, the electronic device 100 may further obtain a somatosensory action template shared with another electronic device. Specifically, after the electronic device 100 learns and generates an action template of a somatosensory action, the user may further send the somatosensory action to the Internet for sharing with another user. Therefore, the user of the electronic device 100 may download an action template uploaded by another user from the Internet as a preset template. Then, the electronic device 100 may associate the template with a specific remote control key. In a game process, the electronic device 100 may recognize an action in the template, query the remote control key corresponding to the action template, and then simulate the key to control an operation object in a game to generate a corresponding action.

In some embodiments, in a process of recognizing the somatosensory action of the user and controlling a game operation, the electronic device 100 may further support the remote control 300 in controlling the game. This is not limited in this application.

FIG. 3A to FIG. 3I, FIG. 4A to FIG. 4D, and FIG. 5A to FIG. 5C describe a series of user interfaces used by the electronic device 100 to recognize a somatosensory action of the user, and replace a remote control key with the action, to control a game. Through implementation of the method, the user may select, based on a preference of the user, a specific somatosensory action to replace a remote control key operation. The somatosensory action may be randomly performed by the user, or may be some actions preset by the electronic device 100. Then, the user may control a game operation in the game by using the somatosensory action. In this control process, a conventional game controlled by using a remote control key can be converted into a somatosensory game controlled by using a somatosensory action without use of a specific somatosensory peripheral.

Through implementation of the method, the user can implement exercise in game entertainment, to achieve an effect of keeping fit and keeping healthy. In addition, somatosensory games transformed by using the method provided in the present invention are rich in both type and quantity, and the user can frequently change games, to meet novelty of the user, and prompt the user to stick to exercise for long time.

Embodiments of this application describe, below with reference to the foregoing user interfaces, a process in which the electronic device 100 learns a somatosensory action of the user and replaces a remote control operation. FIG. 6A shows an example of a process in which the electronic device 100 learns a somatosensory action and replaces a remote control operation.

S101: The electronic device 100 enters a learning mode.

Referring to the user interface 32, after the electronic device 100 detects a user operation acting on the add control

323, the electronic device 100 may display the user interface 33 in response to the operation. In this case, the electronic device 100 enters a mode of learning a somatosensory action of the user. In this mode, the electronic device 100 may receive a control signal of a remote control key selected by the user, recognize and learn a somatosensory action of the user, and match the control signal of the remote control key with the somatosensory action of the user, to establish a correspondence between the control signal of the remote control key and the somatosensory action.

S102: The electronic device 100 obtains a control signal generated by a remote control key selected by the user.

After entering the learning mode, the electronic device 100 may first receive the control signal of the specific remote control key selected by the user. The remote control key is a key replaced with a subsequently learned somatosensory action. Referring to the user interface 33, the electronic device 100 may detect a user operation in which the user selects a remote control key by using the scroll control 333, and in response to the operation, the electronic device 100 may record a control signal of the specific remote control key selected by the user, for example, a "right key" control signal sent by the remote control 200 to the electronic device 100 in response to an operation in which the user taps "right key".

S103: The electronic device 100 learns a customized somatosensory action of the user, and generates an action template.

After recording the control signal of the remote control key selected by the user, the electronic device 100 may invoke the camera 400. By using the camera 400, the electronic device 100 may obtain somatosensory action data including skeleton nodes of the user. First, the electronic device 100 may obtain a set of skeleton node data (a first set of data) of a somatosensory action completed by the user when the user directly faces the screen. Then, the electronic device 100 may prompt the user to change an angle at which the user faces the screen, to re-complete the somatosensory action. In this way, the electronic device 100 may obtain another set of skeleton node data (a second set of data) of the somatosensory action completed by the user when the user changes at a specific angle.

The electronic device 100 may generate an action template by using the two sets of data. The action template may include a skeleton node feature and a threshold interval of the somatosensory action. It may be understood that the action template may further include another parameter or indicator, so that the action template generated by the electronic device 100 is more accurate.

The skeleton node feature includes coordinates of skeleton nodes and limb vectors formed by the skeleton nodes. The limb vector further includes a module length of the vector and an included angle between the vector and a Y-axis. The ground is used as a horizontal plane, and a positive direction of the Y-axis is an upward direction perpendicular to the horizontal plane, that is, a direction perpendicular to the horizontal plane from human feet to a head is the positive direction of the Y-axis. The threshold interval indicates a receiving interval of the electronic device 100. When a distance between any set of skeleton node data and the first set of data falls within the receiving interval, the electronic device 100 may consider that two somatosensory actions indicated by the two sets of data are similar and are a same action. On the contrary, the two actions are not similar and are different actions. Specifically, how the electronic device 100 learns the somatosensory action and calculates the threshold interval is described in detail in a subsequent somatosensory learning algorithm part in embodiments of this application. Details are not described herein.

For example, as shown in the user interface 34 and the user interface 35, the electronic device 100 learns the somatosensory action "left fist". The electronic device 100 may obtain the first set of skeleton node data of "left fist" by using the entered first image. Then, the electronic device 100 may obtain the second set of skeleton node data of "left fist" by using the entered second image. Then, the electronic device 100 may calculate a distance between the second set of data and the first set of data. The distance indicates a threshold interval at which the electronic device 100 recognizes "left fist". The two sets of skeleton node data and the threshold interval may constitute a "left fist" template. The template may instruct the electronic device 100 to recognize whether a somatosensory action of the user in a game is a "left fist" action.

S104: The electronic device 100 locks the action template.

After generating the action template by using the foregoing method, the electronic device 100 may further require the user to directly face the camera 400 of the electronic device 100 to re-complete the somatosensory action, so that the electronic device 100 can obtain a third set of skeleton node data (a third set of data) of the action. The third set of data may be used to determine and lock the action template.

Specifically, after the electronic device 100 obtains the third set of data, the electronic device 100 may calculate a distance between the third set of data and the first set of data. Then, the electronic device 100 may compare the distance with the threshold interval in the action template. When the distance falls within the threshold interval, the electronic device 100 may consider that a somatosensory action indicated by the third set of data is consistent with the action indicated by the action template, that is, the two actions are a same action. In addition, the electronic device 100 may consider that the user can normally complete the somatosensory action. Then, the electronic device 100 may lock the action template, that is, lock the skeleton node feature and the threshold interval of the somatosensory action indicated by the action template.

If the distance between the third set of data and the first set of data does not fall within the threshold interval in the action template, the electronic device 100 cannot recognize a somatosensory action indicated by the third set of data. Further, the electronic device 100 may further consider that the user cannot normally complete the action. Therefore, the electronic device 100 cannot lock the action template.

Then, the electronic device 100 may re-learn the action, for example, obtain a new second set of data, and then calculate a new threshold interval. In some other embodiments, the electronic device 100 may alternatively require the user to re-determine the action, to ensure that the user can normally complete the action, so that the electronic device 100 can finally recognize, based on the action template, the somatosensory action indicated by the third set of data, to lock the action template.

Referring to the user interface 36, the electronic device 100 may prompt, by using the prompt window 363, the user to directly face the screen to re-complete the somatosensory action "left fist". Then, the electronic device 100 may obtain the third set of skeleton node data of "left fist". Then, the electronic device 100 may calculate a distance between the third set of data and the first set of data obtained in the user interface 34. When the distance falls within the threshold interval of the "left fist" template, the electronic device 100 may recognize that a somatosensory action indicated by the third set of data is "left fist", and display the prompt window 364 to prompt the user that the "left fist" template is locked. When the distance does not fall within the threshold interval of the "left fist" template, referring to the user interface 37, the electronic device 100 may display the prompt window 372 to prompt the user that the electronic device 100 needs to re-learn the "left fist" action.

S105: The electronic device 100 determines a matching relationship between the control signal and the action template.

After completing locking of the action template, the electronic device 100 may associate the action template with the control signal of the remote control key selected by the user. As shown in the user interface 38, after locking the "left fist" template, that is, completing learning of the "left fist" action, the electronic device 100 may display the control 381 in a "learned somatosensory action" area. The control 381 may indicate the somatosensory action "left fist" learned by the electronic device 100. In addition, the electronic device 100 may display the control 382 behind the control 381. The control 382 may indicate that the user selects the remote control key "right key". In this way, the user can know that the somatosensory action "left fist" can replace the remote control key "right key".

S106: When entering a game, the electronic device 100 obtains an image including a somatosensory action of the user.

After the electronic device 100 completes learning of the somatosensory action and matching with the control signal of the remote control key, the electronic device 100 may detect a user operation in which the user chooses to start a game, and the electronic device 100 may display a game interface of the game in response to the operation. In addition, the electronic device 100 may enable the camera 400. The camera 400 may obtain an image including a somatosensory action of the user. The electronic device 100 may display the image.

In some embodiments, the electronic device 100 may further display, when displaying the image, skeleton nodes recognized by the skeleton node recognition module.

S107: The electronic device 100 matches the somatosensory action of the user with the learned action template.

The camera 400 may send the image to the electronic device 100. The electronic device 100 may recognize the skeleton nodes of the user by using the image. Further, the electronic device 100 may compare the skeleton nodes with all learned action templates of somatosensory actions, to recognize the somatosensory action indicated by the skeleton node data.

With reference to the diagram of the software structure of the electronic device 100 shown in FIG. 2A, after obtaining the image including the somatosensory action of the user, the camera 400 may send the image to the skeleton node recognition module 209. The skeleton node recognition module 209 may calculate the skeleton node data of the somatosensory action of the user in the image. If the image is a two-dimensional image, the module may obtain two-dimensional data of the skeleton nodes of the user from the image. If the image is a three-dimensional image with depth data, the module may obtain three-dimensional data of the skeleton nodes of the user from the image.

Then, the skeleton node recognition module 209 may send the recognized skeleton node data to the data entry module 206. In this case, the data entry module 206 first determines a source scenario of the data. When the data entry module 206 determines that the data is obtained by the camera 400 in a game process, the data entry module 206 may send the data to the action matching module 208.

The action matching module 208 may extract a skeleton node feature from the data. Further, the action matching module 208 may calculate a distance between the feature and that in the action template of the learned somatosensory action. When the distance falls within a threshold interval of the action template, the action matching module 208 may recognize the somatosensory action indicated by the data. The action is the somatosensory action indicated by the action template.

Referring to the user interface 43, the window 432 may display the image that includes the somatosensory action of the user and that is obtained by the camera 400. The image may further include the skeleton nodes recognized by the skeleton node recognition module. The electronic device 100 may recognize that the somatosensory action in the image is a "left fist" action.

S108: The electronic device 100 simulates the remote control key that matches the action template, to control the game.

With reference to the diagram of the software structure of the electronic device 100 shown in FIG. 2A, after the action matching module 208 recognizes the somatosensory action of the user, the remote control signal module 205 may obtain replacement information of the somatosensory action based on a matching relationship between the somatosensory action and the control signal of the remote control key, that is, the electronic device 100 may know a specific remote control key whose generated control signal is replaced with the somatosensory action.

The remote control signal module 205 may simulate the control signal to control the game. Specifically, the remote control signal module 205 may send an analog signal to the game module 201. In response to the analog signal, the signal may control a role in the game to perform a corresponding action.

Referring to the user interface 43, after the electronic device 100 recognizes that the user performs a "left fist" action, the electronic device 100 may control, based on a matching relationship that is between the "left fist" action and the right key of the remote control and that is shown in FIG. 3H, the game role 4 to move rightward. In response to the control operation of moving rightward, the game role 4 moves from the runway 2 to the runway 3.

Then, the electronic device 100 may further recognize a second somatosensory action of the user, and simulate a control signal of a remote control key replaced by the second somatosensory action, to control the game. The foregoing process is repeated until the game ends.

The following describes in detail the process that is described in S103 and in which the electronic device 100 learns the customized somatosensory action of the user. FIG. 6B shows an example of specific calculation steps of the foregoing process.

Figure 6C:
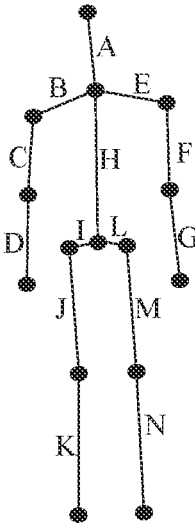
FIG. 6C to FIG. 6E are schematic diagrams of sets of skeleton nodes according to embodiments of this application.

First, FIG. 6C shows an example of a set of skeleton node data in a standard stance. The set of skeleton node data includes 15 skeleton nodes and 14 limb vectors. The limb vectors may be obtained through calculation by using coordinate locations of the 15 skeleton nodes. Table 1 shows an example of 14 limbs in a first set of data.

TABLE 1

| Number | Name |
|---|---|
| A | Neck |
| B | Right shoulder |
| C | Right upper arm |
| D | Right lower arm |
| E | Left shoulder |
| F | Left upper arm |
| G | Left lower arm |
| H | Torso |
| I | Right hip |

TABLE 1-continued

| Number | Name |
|--------|------|
| J | Right thigh |
| K | Right shank |
| L | Left hip |
| M | Left thigh |
| N | Left shank |

The skeleton nodes are obtained based on a two-dimensional image collected by the camera 400.

In some embodiments, the camera 400 may further have a capability of collecting a depth map. Therefore, the camera 400 can obtain a depth map in which the user completes the somatosensory action. Further, the electronic device 100 may obtain three-dimensional skeleton node data of the somatosensory action. For the three-dimensional data, refer to a process of two-dimensional data. Details are not described in this embodiment of this application.

It may be understood that the skeleton node recognition module 209 may further recognize more skeleton nodes. This is not limited in this embodiment of this application.

A skeleton node recognition algorithm includes similarity. The similarity may be used by the electronic device 100 to determine whether a recognized somatosensory action is similar to a learned action. The similarity includes a threshold, namely, minimum similarity. When similarity obtained by calculating two sets of skeleton node data is lower than the minimum similarity, somatosensory actions indicated by the two sets of data are different actions. On the contrary, somatosensory actions indicated by the two sets of data are a same action.

The similarity may be calculated by using limb weights and distances between calculated limbs and limbs m an action template. The foregoing calculation process is, for example:

$$\text{Similarity}=\text{Weight of limb 1}\times\text{Distance 1}+\text{Weight of limb 2}\times\text{Distance 2}+ \ldots +\text{Weight of limb 15}\times\text{Distance 15.}$$

It may be understood that the foregoing calculation process is a possible example. This is not limited in this embodiment of this application.

S201: The electronic device 100 obtains a first set of skeleton node data of the customized somatosensory action.

Figure 6D:
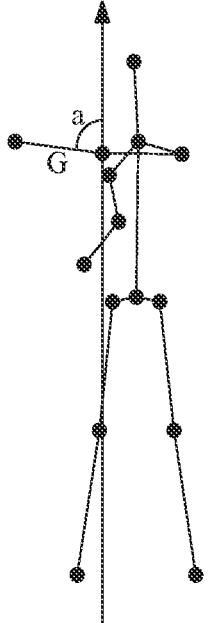

When entering a learning mode, the electronic device 100 may indicate the user to directly face the screen to complete the customized somatosensory action once. The camera 400 may obtain a series of image frames in which the user completes the action. The electronic device 100 may recognize, through static detection, that the user has completed the somatosensory action, and then use an image in a static state as a first image. Skeleton node data in the first image is the first set of skeleton node data (a first set of data). FIG. 6D shows an example of the first set of data.

The static detection may be implemented by comparing several consecutive frames of images, that is, in the several consecutive frames of images, skeleton node data of the user is basically consistent. In this case, the electronic device 100 may determine that the user has completed the somatosensory action.

In another embodiment, the electronic device 100 may alternatively obtain, as the first set of skeleton node data, a series of image frames in which the user completes the somatosensory action. This is not limited in this application.

S202: The electronic device 100 selects a key limb, and increases a similarity calculation weight of the key limb.

The electronic device 100 may calculate similarity between limb vectors in the first set of data and the limb vectors in the skeleton node data in the standard stance. By using the similarity, the electronic device 100 may select the key limb in the first set of data.

For example, compared with FIG. 6C, in FIG. 6D, actions of legs, a torso, and a right arm have relatively high similarity with actions of corresponding limbs in the standard stance. Therefore, the limbs are not used as key limbs. However, a left upper arm and a left lower arm have relatively large differences with corresponding limbs in the standard stance. Therefore, the left upper arm and the left lower arm may be used as key limbs in the first set of data shown in FIG. 6D, and rest parts are non-key limbs.

After recognizing the key limb, the electronic device 100 may correspondingly increase the weight of the key limb, and also reduce a weight of a non-key limb. For example, when similarity of a non-key limb is 90%, a weight of the non-key limb may be reduced by 10%, that is, New weight=1−Similarity; and when similarity of a key limb is −70%, a weight of the key limb may be increased to 170%. It may be understood that the foregoing adjustment policy is merely an example. The electronic device 100 may alternatively use another method for adjusting a weight of a key limb. Therefore, the foregoing adjustment policy should not constitute a limitation on this embodiment of this application.

S203: The electronic device 100 obtains second skeleton node data of the customized somatosensory action.

After obtaining the first set of data of the user, the electronic device 100 may indicate the user to change an angle at which the user faces the screen, and then re-complete the somatosensory action. After static detection is performed, the electronic device 100 may obtain a second image of the action. Skeleton node data in the second image is the second set of skeleton node data (a second set of data).

After obtaining the second set of data, the electronic device 100 may extract a key limb in the second set of data with reference to the method in S202. When the key limb in the second set of data is inconsistent with the key limb in the first set of data, the electronic device 100 may consider that the second set of data is incorrect. Therefore, the electronic device 100 may prompt the user to re-adjust an angle at which the user faces the camera 400 and complete the action. Further, the electronic device 100 may obtain a new second image and a new second set of data.

When the key limb in the second set of data is consistent with the key limb in the first set of data, the electronic device 100 may perform next-step processing: calculating a threshold interval of the somatosensory action by using the first set of data and the second set of data.

Figure 6E:
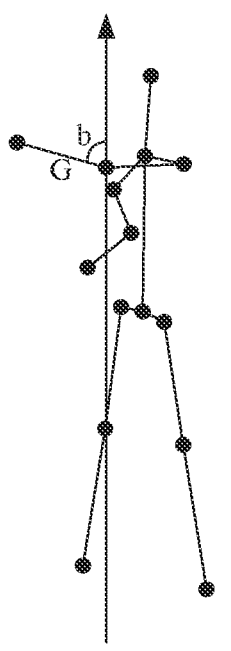

FIG. 6E shows an example of the second set of data obtained by the camera 400 after the user rotates the body. The user rotates the body, so that there may be a relatively obvious difference between the second set of data obtained by the electronic device 100 and the first set of data. Therefore, when the electronic device 100 learns the threshold interval of the somatosensory action, an obtained threshold interval is relatively large. In this way, a requirement for recognizing, by the electronic device 100, an action performed by the user in a game process is reduced, so that the user can have better game experience in the game process.

Optionally, in another embodiment, the second image obtained by the electronic device 100 may be completed by the user when the user directly faces the screen, that is, the user directly faces the screen to complete a somatosensory action three times.

S204: The electronic device 100 calculates the threshold interval.

Based on the limb vectors in the first set of data, the electronic device 100 may calculate an included angle between each limb vector and a Y-axis. Likewise, the electronic device 100 may calculate an included angle between each limb vector in the second set of data and the Y-axis. For any limb vector, included angles in the two sets of data are combined into a threshold interval of the vector.

For example, for the left lower arm G in FIG. 6D and FIG. 6E, an included angle that is between the left lower arm G and the Y-axis and that is calculated by using the first set of data is 75°, and an included angle that is between the left lower arm G and the Y-axis and that is calculated by using the second set of data is 60°. Therefore, a threshold interval of an included angle between the left lower arm G and the Y-axis is (60°, 75°).

S205: The electronic device 100 obtains a third set of skeleton node data of the customized somatosensory action.

After completing calculation of the threshold interval, the electronic device 100 may require the user to re-complete the somatosensory action, to obtain a third image of the action. The third image may include the third set of skeleton node data (a third set of data).

S206: The electronic device 100 recognizes the third set of data and locks an action template.

The electronic device 10 may calculate limb vectors based on skeleton node data in the third set of data, and may further obtain an included angle between each limb vector and the Y-axis; and then compare the included angle with a threshold interval that is of each limb vector and that is calculated in S204.

If the included angle between each limb vector in the third set of data and the Y-axis falls within the threshold interval of the limb vector, similarity M between the third set of data and the first set of data is further calculated. Refer to the foregoing similarity calculation process. When the similarity M is higher than minimum similarity, the electronic device 100 may determine that a somatosensory action indicated by the third set of data is similar to a somatosensory action indicated by the first set of data.

Therefore, the electronic device 100 may consider that learning results of the two sets of data are correct, in other words, the threshold interval determined by using the first set of data and the second set of data is appropriate. In addition, the electronic device 100 may determine that the user can normally complete the somatosensory action, and the somatosensory action is not an accidental action that is difficult to repeat. In this way, the electronic device 100 can determine the threshold interval of the somatosensory action learned in the foregoing process, that is, lock a learning template.

On the contrary, the electronic device 100 may consider that a somatosensory action indicated by the third set of data is not similar to a somatosensory action indicated by the first set of data. Therefore, the electronic device 100 may obtain a new second set of data, to adjust the threshold interval in the action template, and improve a recognition capability of the electronic device 100. In some other embodiments, the electronic device 100 may alternatively obtain a new third set of data, to correct the action of the user, and improve readiness of the action of the user.

After locking the action template, the electronic device 100 completes a learning process of the somatosensory action. In a game process, the electronic device 100 may recognize a somatosensory action of the user based on the locked template, and then complete matching with a remote control key, to implement a game operation.

In an optional implementation, the electronic device 100 may first store learned somatosensory action templates as preset templates. Then, when necessary, the user may select a remote control key and a preset template, and associate the template with a control signal of the remote control key. When a preset action template of the electronic device 100 is used, for a process in which the electronic device 100 learns a somatosensory action of the user and replaces a remote control key in a game, refer to FIG. 7.

Figure 7:
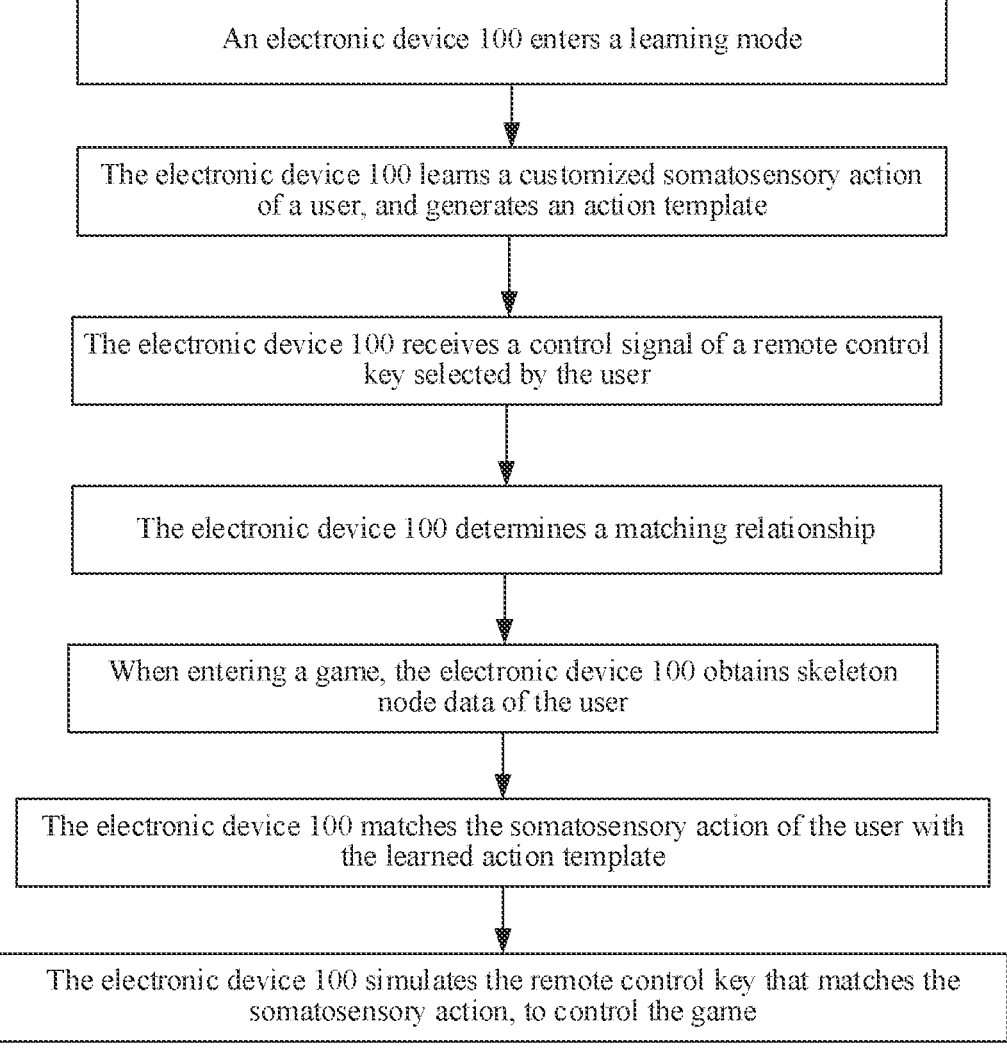
FIG. 7 is another flowchart for matching a somatosensory action with a remote control key to control a game according to an embodiment of this application.

As shown in FIG. 7, after the electronic device 100 enters a learning mode, the electronic device 100 may learn a customized somatosensory action of the user, and generate an action template. For a specific process, refer to the descriptions of S103 and S104 shown in FIG. 6A. Details are not described herein again.

Then, before the user opens a game, or after the user opens the game but before the user starts the game, the electronic device 100 may display a somatosensory action configuration page, referring to FIG. 5A. In this case, the electronic device 100 may receive a control signal of a remote control key selected by the user, for example, a control signal of "right key" shown in the user interface 51.

Then, the electronic device 100) may display learned action templates, namely, preset templates, for example, the preset template 521, the preset template 522, and the preset template 523 in the user interface 52. In response to a user operation acting on a preset template, the electronic device 100 may establish a matching relationship between a somatosensory action indicated by the template and the control signal of the selected remote control key. Referring to the user interface 52, an operation in which the user selects a somatosensory action may be completing an action in a preset template.

The electronic device 100 may detect that the user completes the somatosensory action in the preset template. In this case, the electronic device 100 may obtain an image frame obtained through static detection when the user completes the somatosensory action. Further, the electronic device 100 may obtain skeleton node data in a process in which the user completes the action. By calculating differences between the data and skeleton node data in the preset templates, the electronic device 100 may recognize, by using relationships between the differences and threshold intervals in all the preset templates, a specific preset template that indicates a somatosensory action completed by the user. Then, the electronic device 100 may associate the preset template with the control signal of the selected remote control key, to determine a matching relationship between the preset template and the control signal of the remote control key. For example, after detecting that the user completes an action indicated by the preset template "stride", the electronic device 100 may associate the preset template "stride" with the control signal of "right key" that is of the remote control and that is selected in the foregoing process.

Through implementation of the foregoing method for selecting a preset template, the electronic device 100 may know a specific preset template that the user wants to select, and the electronic device 100 may also detect, in a selection process, whether a somatosensory action of the user is standard. For example, when the user wants to select the stride action indicated by the preset template 522, the electronic device 100 may detect skeleton node data of the stride action completed by the user. If the electronic device 100 cannot recognize the action, it means that the user completes the action in a non-standard manner. Therefore, the electronic device 100 may prompt the user to complete the action in a more standard manner. This helps the user achieve an objective of exercise and fitness during a game.

In some other embodiments, the electronic device 100 may alternatively select a preset template by being controlled by using the remote control. Details are not described in this embodiment of this application.

Then, after matching between the somatosensory action indicated by the preset template and the control signal of the remote control key is completed, the user can control a game operation by using the somatosensory action in a game. In a game process, when the electronic device 100 recognizes the somatosensory action indicated by the preset template, the electronic device 100 may query, based on the matching relationship between the somatosensory action and the control signal of the remote control key, the control signal of the specific remote control key replaced with the action. Then, the electronic device 100 may simulate the control signal to control an operation object in the game to generate a corresponding action.

Specifically, the electronic device 100 may obtain skeleton node data of the user in the game. The data comes from an image that is collected by the camera 400 and that includes a body form of the user. Based on the skeleton node data, the electronic device 100 may recognize a specific preset template whose somatosensory action is completed by the user. Then, the electronic device 100 may query a control signal that is of a remote control key and that matches the somatosensory action. Further, the electronic device 100 may simulate the control signal to control a game operation.

In embodiments of this application, the following should be noted:

In S102 of the foregoing method, the control signal that is generated by the specific remote control key selected by the user and that is received by the electronic device may be referred to as a first key signal. The specific remote control key is a first key, for example, "right key" shown in FIG. 3C.

In S107 of the foregoing method, a role in a game may be referred to as an operation object, for example, the operation object 4 in FIG. 4B. A change of the role in the game may be referred to as a first action, for example, an action in which the operation object 4 jumps from the runway 2 to the runway 3.

In S103 of the foregoing method, a specific action completed by the user when the user faces the electronic device may be referred to as a first somatosensory action. An action template generated by the electronic device by learning the first somatosensory action of the user may be referred to as a first action template, for example, the "left fist" action template obtained by learning the "left fist" action of the user.

An interface in which the electronic device displays a remote control key and a somatosensory action may be referred to as a first interface, for example, the user interface 38 shown in FIG. 3H.

In S103 of the foregoing method, an image frame sequence obtained by the electronic device through collection when the user completes the somatosensory action may be referred to as a first image sequence. An image that is determined by the electronic device from the first image sequence and that is obtained through static detection may be referred to as a first image, for example, the image displayed in the window 343 in the user interface 34. Skeleton node data obtained by the electronic device by recognizing skeleton nodes of the user in the first image may be referred to as a first set of skeleton node data.

An image frame sequence obtained by the electronic device through re-collection when the user completes the somatosensory action may be referred to as a second image frame sequence. An image that is determined by the electronic device from the second image frame sequence and that is obtained through static detection may be referred to as a second image, for example, the image displayed in the window 353 in the user interface 35. Skeleton node data obtained by the electronic device by recognizing skeleton nodes of the user in the second image may be referred to as a second set of skeleton node data.

Likewise, in an image frame sequence obtained by the electronic device through third-time collection when the user completes the somatosensory action, an image obtained through static detection may be referred to as a third image, for example, the image displayed in the prompt window 363 in the user interface 36. Skeleton node data obtained by the electronic device by recognizing skeleton nodes of the user in the third image may be referred to as a third set of skeleton node data.

Learned somatosensory action templates pre-stored in the electronic device may be referred to as preset action templates, for example, the plurality of action templates displayed in the user interface 52.

In S107 of the foregoing method, an image that is collected by the electronic device in the game process and that includes a specific somatosensory action completed by the user may be referred to as a fourth image, and skeleton node data obtained by the electronic device by recognizing skeleton nodes of the user in the fourth image may be referred to as a fourth set of skeleton node data.

Through implementation of the method, shown in FIG. 7, in which the electronic device 100 learns a somatosensory action of the user and replaces a remote control key in a game, the electronic device 100 may separate a learning process from a process of establishing a matching relationship with a control signal of the remote control key. The electronic device 100 may learn a plurality of somatosensory actions of the user in advance, and store, as preset templates, action templates corresponding to the actions. Therefore, the user does not need to determine, when learning a somatosensory action, a remote control key corresponding to the action.

Before the user starts a game, the user may associate the learned somatosensory actions with remote control keys, so that the user can select somatosensory actions based on requirements of different games.

In a somatosensory action learning process, the electronic device 100 may learn a customized action by using the somatosensory learning module. Therefore, the user may select, based on a preference of the user, a specific somatosensory action to replace a remote control key operation. In a somatosensory template generation method used by the learning module, a plurality of angle templates are simulated and transformed, and threshold intervals of limbs are calculated. Therefore, somatosensory action matching robustness can be improved, so that the machine can accurately recognize a somatosensory action of the user.

Further, in a game process, through implementation of the foregoing method, the user can simply and quickly convert a conventional game controlled by using a remote control key into a somatosensory game controlled by using a somatosensory action. In addition, in the conversion process, no specific somatosensory peripheral needs to be used, and no customized development needs to be performed on a game. By converting the conventional game into the somatosensory game, the user can implement exercise in game entertainment, to achieve an effect of keeping fit and keeping healthy. In addition, somatosensory games transformed by using the method provided in the present invention are rich in both type and quantity, and the user can frequently change games, to meet novelty of the user, and prompt the user to stick to exercise for long time.

According to the context, the term "when . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if(a stated condition or event) is detected" may be interpreted as a meaning of "if it is determined that . . . ", "in response to determining that . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in the foregoing embodiments may be implemented by a computer program by instructing relevant hardware. The program may be stored in a computer-readable storage medium. When the program is executed, the processes according to the foregoing method embodiments are included. The foregoing storage medium includes any medium that can store program code, such as a ROM, a random access memory RAM, a magnetic disk, or an optical disc.

What is claimed is:

1. A method, applied to an electronic device, wherein the method comprises:
   obtaining, by a camera, a first image comprising a first user action, wherein the first user action is a first version of the first user action;
   obtaining, by the camera, a second image comprising a second user action, wherein the second user action is a second version of the first user action;
   obtaining a first action template for recognizing somatosensory actions performed by a user;
   obtaining, by the camera, a third image comprising a third user action;

determining whether the third image matches the first user action;
   displaying, when the third image does not match the first user action, a prompt window that requests input of a new second image or a new third image;
   associating a first key with the first action template;
   performing a first operation on the first key;
   generating, when the first operation is performed, a first key signal for controlling the electronic device to perform a first action;
   obtaining, by the camera, an image sequence comprising a user action;
   generating, when recognizing based on the first action template that the user action is a first somatosensory action, a second key signal; and
   performing, by controlling execution of a game application on the electronic device, the first action in response to the second key signal.

2. The method of claim 1, wherein after associating the first key signal with the first action template, the method further comprises displaying a first interface, and wherein the first interface displays an association relationship between the first action template and the first key.

3. The method of claim 1, wherein before obtaining the first action template, the method further comprises:
   recognizing skeleton nodes in the first image to obtain a first set of skeleton node data;
   recognizing skeleton nodes in the second image to obtain a second set of skeleton node data;
   calculating a difference between the first set of skeleton node data and the second set of skeleton node data to obtain a threshold interval; and
   generating the first action template comprising the threshold interval and comprising at least one of the first set of skeleton node data or the second set of skeleton node data.

4. The method of claim 3, wherein obtaining the first image comprising the user action comprises:
   collecting, by the camera, a first image sequence in which the user completes a somatosensory action; and
   determining, as the first image, an image frame having a smallest change amplitude of a somatosensory action of the user compared with a previous image frame in the first image sequence, and
   wherein obtaining the second image comprising the somatosensory action of the user comprises:
      collecting a second image sequence in which the user completes a somatosensory action; and
      determining, as the second image, an image frame having a smallest change amplitude of a somatosensory action of the user compared with a previous image frame in the second image sequence.

5. The method of claim 3, wherein after generating the first action template, the method further comprises:
   recognizing skeleton nodes in the third image to obtain a third set of skeleton node data;
   determining that the third image matches the first user action when the third set of skeleton node data matches the first action template; and
   locking the first action template.

6. The method of claim 5, wherein determining that the third set of skeleton node data matches the first action template further comprises:
   calculating a difference between the third set of skeleton node data and the first set of skeleton node data; and determining, when the difference falls within the threshold interval, that the third set of skeleton node data matches the first action template.

7. The method of claim 3, wherein after obtaining the image sequence comprising the user action, the method further comprises:

obtaining, by the camera, a fourth image from the image sequence;

recognizing skeleton nodes in the fourth image to obtain a fourth set of skeleton node data;

calculating a difference between the fourth set of skeleton node data and the first set of skeleton node data; and recognizing, when the difference falls within the threshold interval, that the user action indicated by the image sequence matches the first action template.

8. The method of claim 1, wherein the method further comprises storing the first action template as a preset action template.

9. The method of claim 1, wherein obtaining the first action template further comprises:

displaying a second interface, wherein the second interface displays a plurality of preset action templates for selection; and selecting the first action template from the plurality of preset action templates.

10. The method of claim 9, wherein the method further comprises:

learning a plurality of user actions of the user, and separately storing the plurality of user actions as the plurality of preset action templates; or obtaining a plurality of shared preset action templates.

11. The method of claim 9, wherein selecting the first action template from the plurality of preset action templates further comprises selecting, when recognizing that an action performed by the user matches the first action template, the first action template from the plurality of preset action templates.

12. An electronic device, comprising:

one or more memories configured to store computer instructions; and one or more processors coupled to the one or more memories and configured to execute the computer instructions to cause the electronic device to:

obtain, by a camera, a first image comprising a first user action, wherein the first user action is a first version of the first user action;

obtain, by the camera, a second image comprising a second user action, wherein the second user action is a second version of the first user action;

obtain a first action template for recognizing somatosensory actions performed by a user;

obtain, by the camera, a third image comprising a third user action;

determine whether the third image matches the first user action;

display, when the third image does not match the first user action, a prompt window that requests input of a new second image or a new third image;

associate a first key with the first action template;

perform a first operation on the first key;

generate, when the first operation is performed, a first key signal for controlling the electronic device to perform a first action;

obtain, by the camera, an image sequence comprising a user action;

generate, when recognizing based on the first action template that the user action is a first somatosensory action, a second key signal; and perform, by controlling execution of a game application on the electronic device, the first action in response to the second key signal.

13. The electronic device of claim 12, wherein the one or more processors are further configured to execute the computer instructions to cause the electronic device to display a first interface, wherein the first interface displays an association relationship between the first action template and the first key.

14. The electronic device of claim 12, wherein the one or more processors are further configured to execute the computer instructions to cause the electronic device to:

recognize skeleton nodes in the first image to obtain a first set of skeleton node data;

recognize skeleton nodes in the second image to obtain a second set of skeleton node data;

calculate a difference between the first set of skeleton node data and the second set of skeleton node data to obtain a threshold interval; and generate the first action template, wherein the first action template comprises the first set of skeleton node data and/or the second set of skeleton node data, and the threshold interval.

15. The electronic device of claim 14, wherein the one or more processors are further configured to execute the computer instructions to cause the electronic device to:

collect, by the camera, a first image sequence in which the user completes a somatosensory action; and determine, as the first image, an image frame having a smallest change amplitude of a somatosensory action of the user compared with a previous image frame in the first image sequence;

collect a second image sequence in which the user completes a somatosensory action; and determine, as the second image, an image frame having a smallest change amplitude of a somatosensory action of the user compared with a previous image frame in the second image sequence.

16. The electronic device of claim 14, wherein the one or more processors are further configured to execute the computer instructions to cause the electronic device to:

recognize skeleton nodes in the third image to obtain a third set of skeleton node data;

determine that the third image matches the first user action when the third set of skeleton node data matches the first action template; and lock the first action template.

17. The electronic device of claim 16, wherein the one or more processors are further configured to execute the computer instructions to cause the electronic device to:

calculate a difference between the third set of skeleton node data and the first set of skeleton node data; and determine, when the difference falls within the threshold interval, that the third set of skeleton node data matches the first action template.

18. The electronic device of claim 12, wherein the one or more processors are further configured to execute the computer instructions to cause the electronic device to:

display a second interface, wherein the second interface displays a plurality of preset action templates for selection; and select the first action template from the plurality of preset action templates.

19. The electronic device of claim 14, wherein the one or more processors are further configured to execute the computer instructions to cause the electronic device to:

obtain a fourth image from the image sequence;

recognize skeleton nodes in the fourth image to obtain a fourth set of skeleton node data;

calculate a difference between the fourth set of skeleton node data and the first set of skeleton node data; and recognize, when the difference falls within the threshold interval, that the user action indicated by the image sequence matches the first action template.

20. A non-transitory computer-readable storage medium comprising instructions, wherein when the instructions are executed on an electronic device, the instructions cause the electronic device to:

obtain, by a camera, a first image comprising a first user action, wherein the first user action is a first version of the first user action;

obtain, by the camera, a second image comprising a second user action, wherein the second user action is a second version of the first user action;

obtain a first action template for recognizing somatosensory actions performed by a user;

obtain, by the camera, a third image comprising a third user action;

determine whether the third image matches the first user action;

display, when the third image does not match the first user action, a prompt window that requests input of a new second image or a new third image;

associate a first key with the first action template;

perform a first operation on the first key;

generate, when the first operation is performed, a first key signal for controlling the electronic device to perform a first action;

obtain, by the camera, an image sequence comprising a user action;

generate, when recognizing based on the first action template that the user action is a first somatosensory action, a second key signal; and perform, by controlling execution of a game application on the electronic device, the first action in response to the second key signal.

\* \* \* \* \*